(12) United States Patent
Lee et al.

(10) Patent No.: US 10,631,254 B2
(45) Date of Patent: Apr. 21, 2020

(54) V2X SIGNAL TRANSMISSION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/085,945

(22) PCT Filed: Mar. 17, 2017

(86) PCT No.: PCT/KR2017/002957
§ 371 (c)(1),
(2) Date: Sep. 17, 2018

(87) PCT Pub. No.: WO2017/160131
PCT Pub. Date: Sep. 21, 2017

(65) Prior Publication Data
US 2019/0090206 A1    Mar. 21, 2019

Related U.S. Application Data

(60) Provisional application No. 62/309,471, filed on Mar. 17, 2016.

(51) Int. Cl.
*H04W 52/32* (2009.01)
*H04L 5/00* (2006.01)
(Continued)

(52) U.S. Cl.
CPC ............ *H04W 52/325* (2013.01); *H04L 1/00* (2013.01); *H04L 5/00* (2013.01); *H04L 5/0044* (2013.01);
(Continued)

(58) Field of Classification Search
CPC . H04L 1/00; H04L 5/00; H04L 5/0094; H04L 25/02; H04L 25/023;
(Continued)

(56) References Cited

U.S. PATENT DOCUMENTS 9,893,853 B2 * 2/2018 Yi .............................. H04L 1/08
2015/0031410 A1 * 1/2015 Lim ..................... H04W 52/146
455/522
(Continued)

FOREIGN PATENT DOCUMENTS

WO    2016036141    3/2016

OTHER PUBLICATIONS

PCT International Application No. PCT/KR2017/002957, International Search Report dated May 23, 2017, 4 pages.
(Continued)

*Primary Examiner* — Yuwen Pan
*Assistant Examiner* — Paul P Tran
(74) *Attorney, Agent, or Firm* — Lee Hong Degerman Kang Waimey

(57) ABSTRACT

Provided are a vehicle-to-everything (V2X) signal transmission method performed by a terminal in a wireless communication system and an apparatus using the same. The method comprises: determining a symbol for transmitting a specific signal related to V2X communication; and transmitting the specific signal in the determined symbol, wherein the determined symbol is determined from among symbols other than symbols overlapping with a power
(Continued)

transient period between a transmission power-on state and a transmission power-off state.

14 Claims, 60 Drawing Sheets

(51) Int. Cl.
  *H04L 25/02*   (2006.01)
  *H04L 25/03*   (2006.01)
  *H04W 52/02*   (2009.01)
  *H04W 72/04*   (2009.01)
  *H04L 1/00*   (2006.01)
  *H04W 4/30*   (2018.01)
  *H04W 4/40*   (2018.01)

(52) U.S. Cl.
  CPC .......... *H04L 5/0048* (2013.01); *H04L 25/023* (2013.01); *H04L 25/0224* (2013.01); *H04L 25/03006* (2013.01); *H04W 4/30* (2018.02); *H04W 52/0209* (2013.01); *H04W 72/0473* (2013.01); *H04L 2025/03382* (2013.01); *H04W 4/40* (2018.02)

(58) Field of Classification Search
  CPC ..... H04L 25/03006; H04L 2025/03382; H04L 5/0044; H04L 5/0048; H04L 25/0224; H04W 4/06; H04W 4/30; H04W 4/40; H04W 4/44; H04W 4/90; H04W 16/10; H04W 52/0209; H04W 52/325; H04W 72/005; H04W 72/02; H04W 72/0406; H04W 72/042; H04W 72/0473; H04W 72/10; H04W 72/1242; H04W 72/1278
See application file for complete search history.

(56) References Cited

U.S. PATENT DOCUMENTS

| | | | |
|---|---|---|---|
| 2016/0174122 A1* | 6/2016 | Sorrentino | H04B 1/3822 370/331 |
| 2017/0019812 A1* | 1/2017 | Lee | H04W 76/14 |
| 2017/0171690 A1* | 6/2017 | Kim | H04L 67/125 |
| 2017/0272299 A1* | 9/2017 | Chae | H04J 11/00 |
| 2018/0159935 A1* | 6/2018 | Cavalcanti | H04W 4/44 |
| 2018/0241508 A1* | 8/2018 | Chervyakov | H04L 5/0051 |
| 2018/0332491 A1* | 11/2018 | Eckardt | H04L 5/0051 |

OTHER PUBLICATIONS

Qualcomm Incorporated, "Synchronization Procedure for V2V", R1-160898, 3GPP TSG-RAN WG1 #84, Feb. 2016, 5 pages.
Ericsson, "On SRS enhancements in Rel.13", R1-154554, 3GPP TSG-RAN WG1#82, Aug. 2015, 2 pages.
ZTE, "Enhancement to sidelink synchronization", R1-160684, 3GPP TSG-RAN WG1 Meeting #84, Feb. 2016, 13 pages.

* cited by examiner

V2X SIGNAL TRANSMISSION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2017/002957, filed on Mar. 17, 2017, which claims the benefit of U.S. Provisional Application No. 62/309,471, filed on Mar. 17, 2016, the contents of which are all hereby incorporated by reference herein in their entirety.

BACKGROUND OF THE INVENTION

Field of the Invention

The present invention relates to wireless communication, and more particularly, to a method of transmitting a vehicle-to-everything (V2X) signal by a UE in a wireless communication system and a UE using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The D2D communication described above may extend to be applied to transmission and reception of signals between vehicles, and communication related to vehicles is specifically termed vehicle-to-everything (V2X) communication.

In V2X, the alphabet 'X' represents a pedestrian (Here, V2X may be represented by V2P), a vehicle (communication between vehicles, here, V2V), an infrastructure/network (communication between a vehicle and a roadside unit, here, V2I/N), or the like.

A (V2P communication-related) device carried by a pedestrian (or a person) will be referred to as a "P-UE" and a (V2X communication-related) device installed in a vehicle will be referred to as a "V-UE". In the present disclosure, "entity" may be interpreted as at least one of "P-UE", "V-UE", and RSU (/network/infrastructure).

Meanwhile, when the UE transmits a signal related to V2X communication, the UE may turn on or off a power amplifier to supply power to the signal. However, a transient period may be required when the power amplifier is changed from OFF to ON or from ON to OFF. During the transient period, transmission power of the corresponding signal may not be provided as desired. Therefore, a V2X signal transmission method in consideration of this is required.

SUMMARY OF THE INVENTION

The present invention provides a method of transmitting a vehicle-to-everything (V2X) signal by a UE in a wireless communication system and a UE using the method.

In one aspect, provided is a vehicle-to-everything (V2X) signal transmission method performed by a user equipment (UE) in a wireless communication system. The method includes determining a symbol for transmitting a specific signal related to V2X communication and transmitting the specific signal on the determined symbol. The symbol is determined from among symbols excluding symbols overlapping a power transient period between a transmission power-on state and a transmission power-off state.

In another aspect, provided is a user equipment (UE). The UE includes a radio frequency (RF) unit transmitting and receiving a radio signal and a processor coupled to the RF unit to operate. The processor determines a symbol for transmitting a specific signal related to V2X communication and transmits the specific signal on the determined symbol. The symbol is determined from among symbols excluding symbols overlapping a power transient period between a transmission power-on state and a transmission power-off state.

According to the present invention, symbols for transmitting a specific signal related to V2X communication are determined from among symbols, excluding symbols overlapping a transient period of power between an ON state of transmission power and an OFF state of transmission power. Thus, a degradation of transmission/reception performance related to the specific signal may be prevented. Also, in case where the specific signal is a reference signal for channel estimation, a degradation of channel estimation performance may also be prevented.

BRIEF DESCRIPTION OF THE DRAWINGS

FIG. 1

DESCRIPTION OF EXEMPLARY EMBODIMENTS

Figure 1:
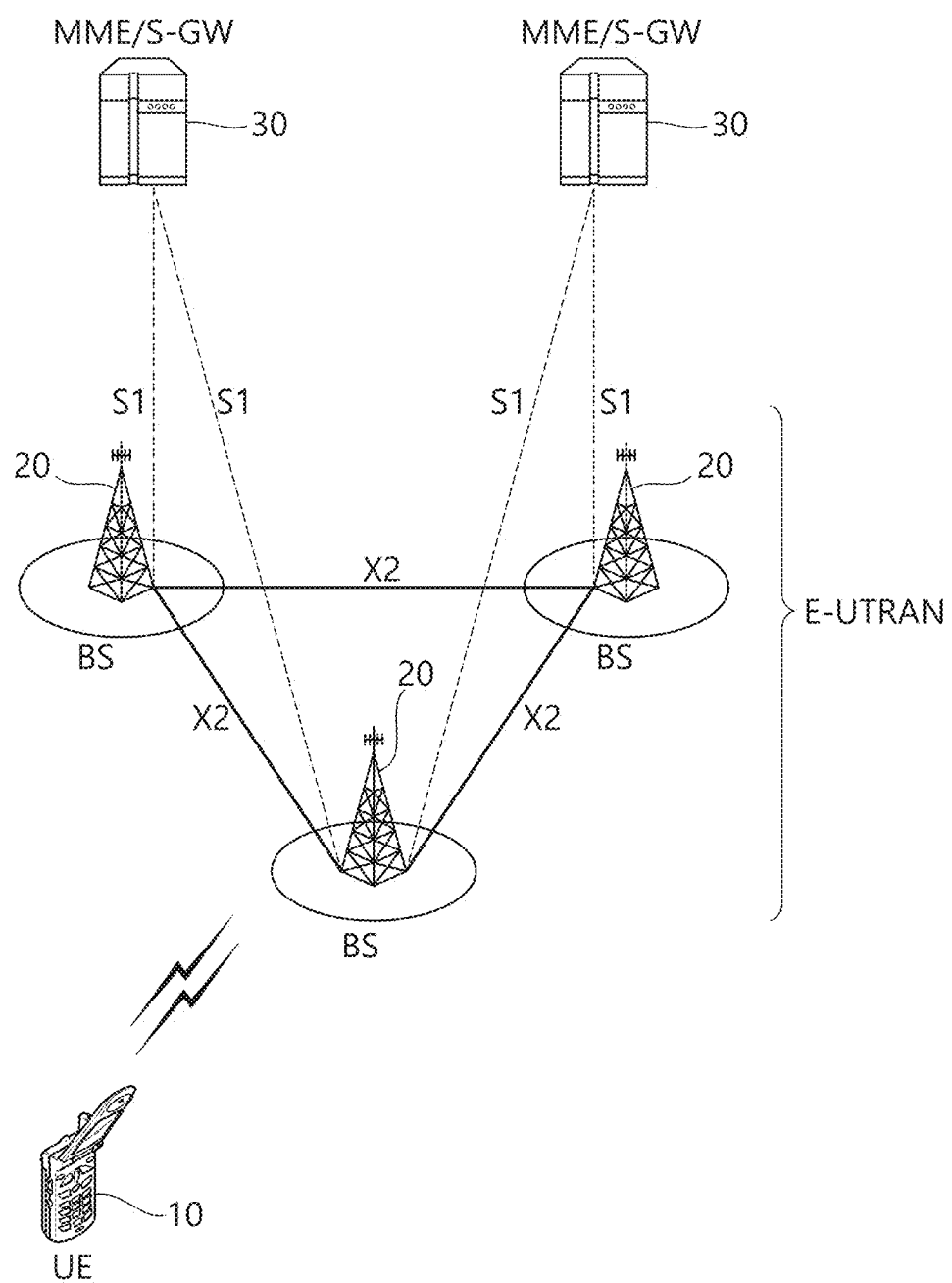
FIG. 1 shows a wireless communication system.

FIG. 1 shows a wireless communication system.

The wireless communication system may be referred to as, for example, Evolved-UMTS Terrestrial Radio Access Network (E-UTRAN) or Long Term Evolution (LTE)/ LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
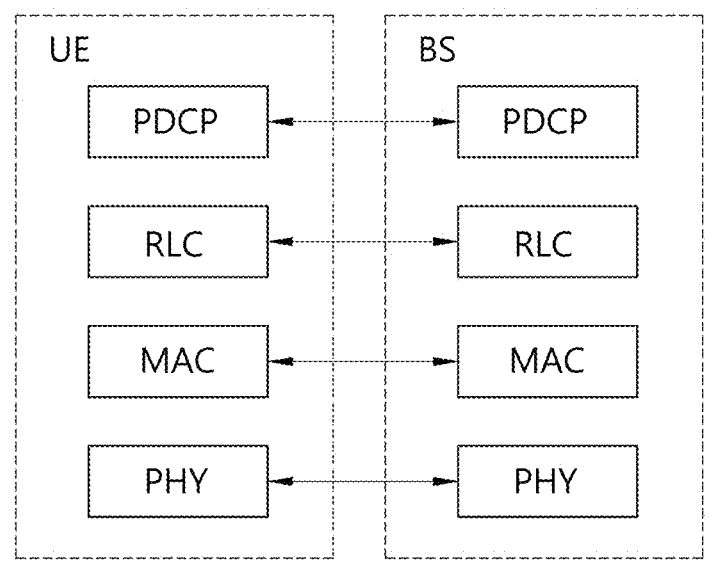
FIG. 2 is a diagram showing a wireless protocol architecture for a user plane.
Figure 3:
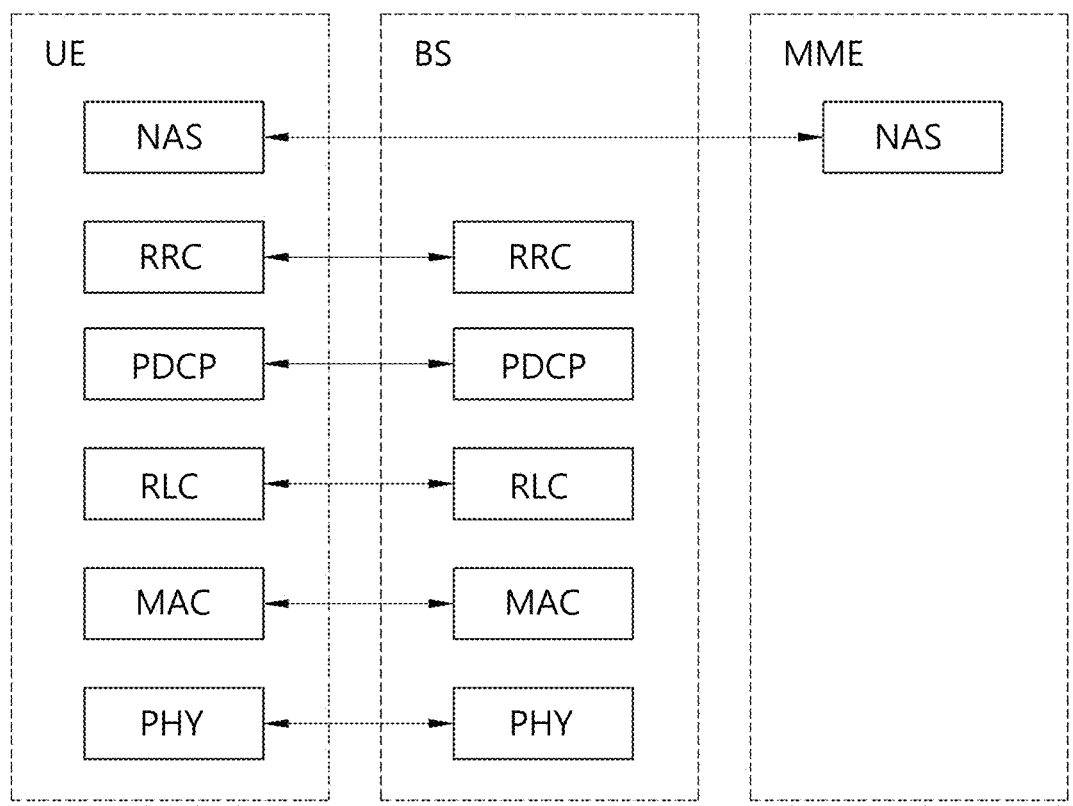
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.—

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
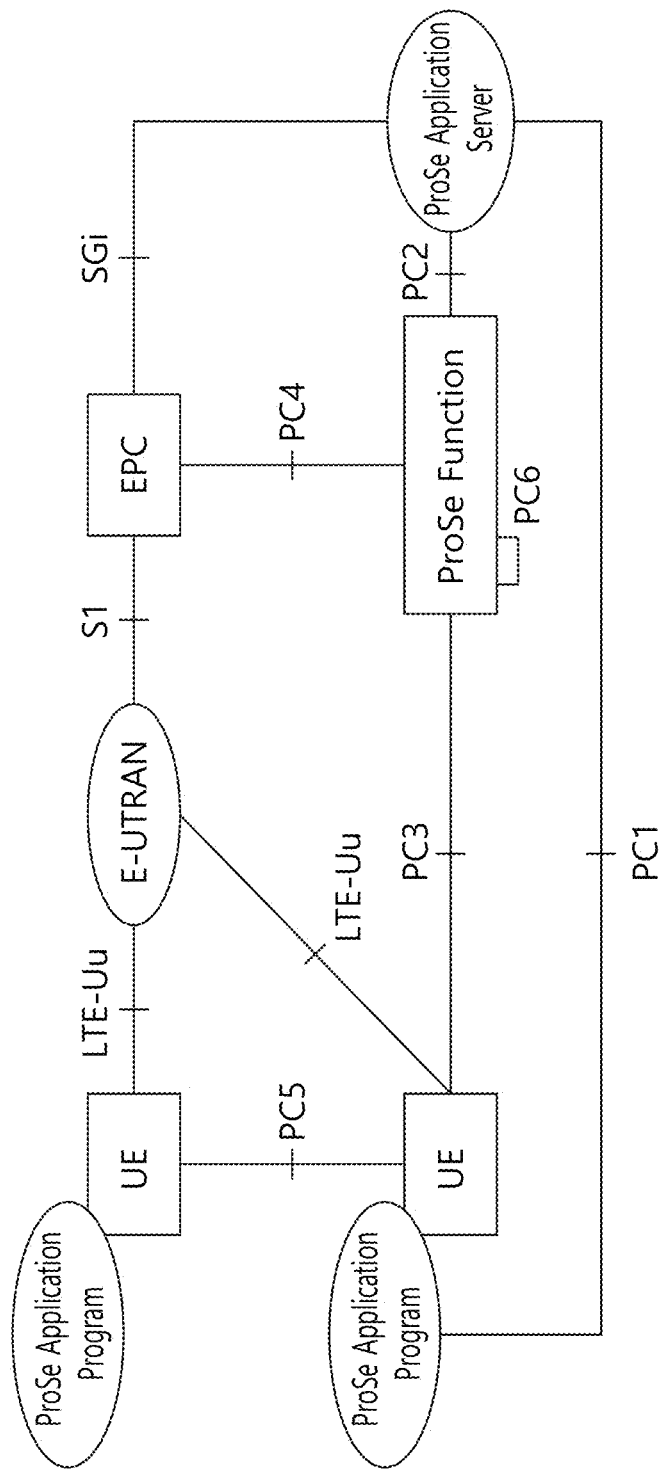
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.
PC2: a reference point between the ProSe APP server and the ProSe function. This is used to define an interaction between the ProSe APP server and the ProSe function. The update of application data in the ProSe database of the ProSe function may be an example of the interaction.
PC3: a reference point between the UE and the ProSe function. This is used to define an interaction between the UE and the ProSe function. A configuration for ProSe discovery and communication may be an example of the interaction.
PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
PC5: a reference point used for using control/user plane for discovery and communication, relay, and 1:1 communication between types of UE.
PC6: a reference point for using a function, such as ProSe discovery, between users belonging to different PLMNs.
SGi: this may be used to exchange application data and types of application dimension control information.

D2D action (operation) can be supported both when the terminal is serviced within the coverage of the network (cell) and when it is out of coverage of the network.

Figure 5:
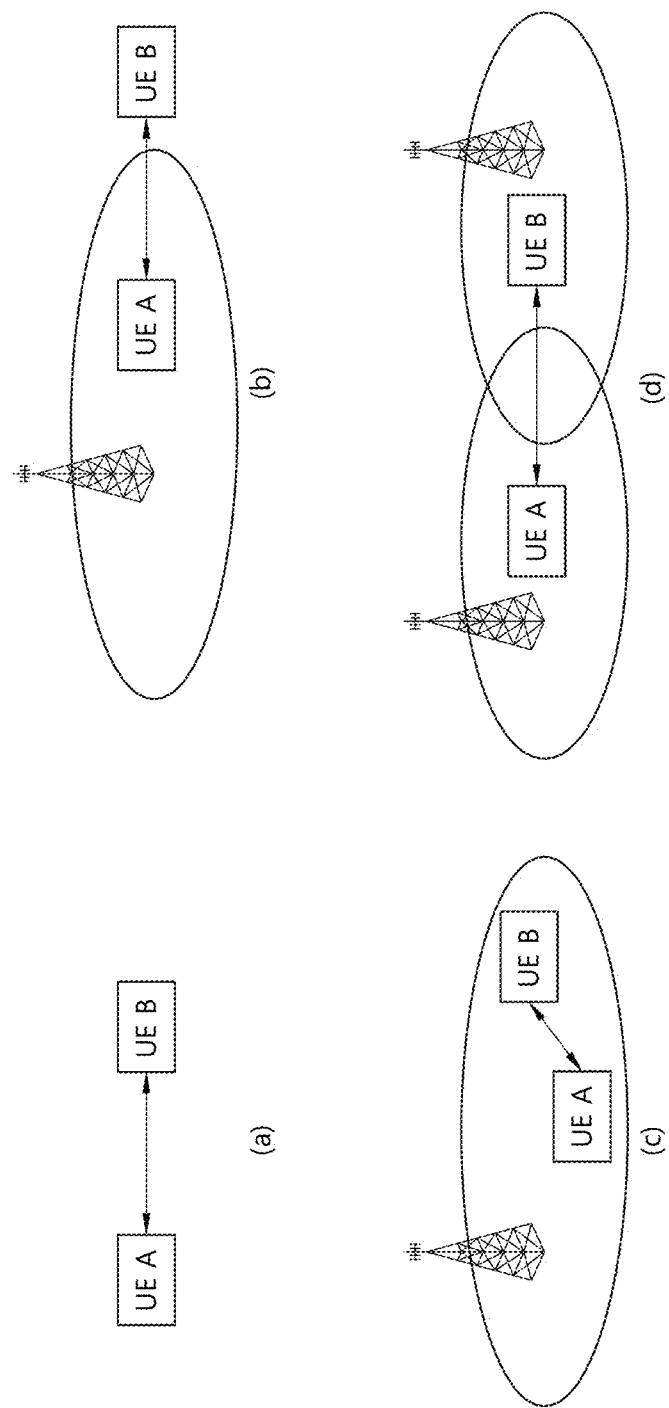
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

D2D action (operation) may be performed between types of UE placed at various positions as in FIG. 5.

Meanwhile, when a UE is changed from a power-off state to a power-on state or from the power-on state to the power-off state, a time period called a transient period may take place. An ON/OFF time mask may define an observation period between OFF power and ON power and between ON power and OFF power. OFF power measurement period may be defined in at least one subframe period excluding the transient period. The ON power may be defined as average power over one subframe excluding the transient period.

Figure 6:
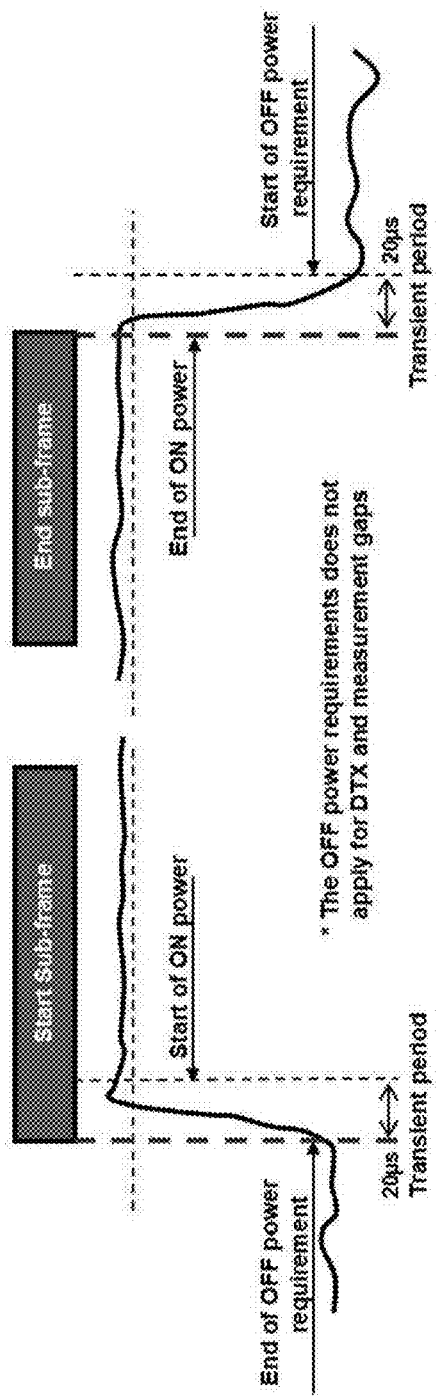
FIG. 6 illustrates an ON/OFF time mask.

FIG. 6 illustrates an ON/OFF time mask.

Referring to FIG. 6, when a state changes from OFF power to ON power, a transient period of 20 μs may be present. Similarly, when a state changes from ON power to OFF power, a transient period of 20 us may be present. Although a power amplifier of the UE supplies power in the OFF state, the ON power state may start after the lapse of the transient period. Similarly, although the power amplifier of the UE cuts off power in the ON power state, the OFF power state may start after the lapse of the transient period.

ProSe, i.e., an ON/OFF time mask a D2D operation, may be defined. Additional requirements for D2D discovery and D2D communication may be required for the ON/OFF time mask.

Figure 7:
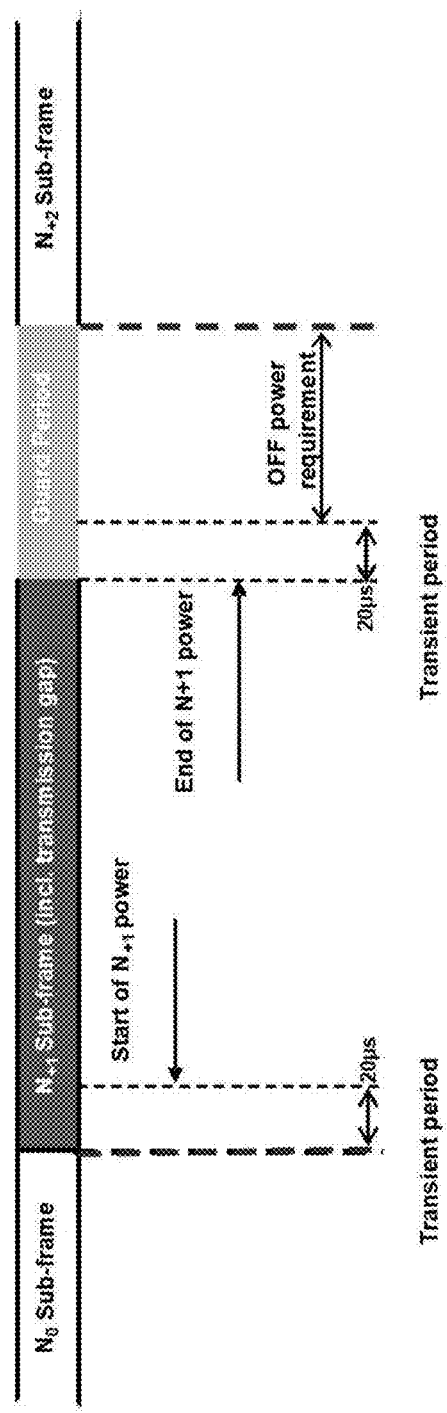
FIG. 7 illustrates a time mask for a PSDCH/PSCCH/ PSSCH.

FIG. 7 illustrates a time mask for a PSDCH/PSCCH/PSSCH.

Referring to FIG. 7, the ON/OFF time mask may define an observation period between OFF power and ON power and between ON power and OFF power for the PSDCH. In a subframe where the PSCCH and the PSSCH are transmitted, the last symbol may be punctured to generate a guard period.

Figure 8:
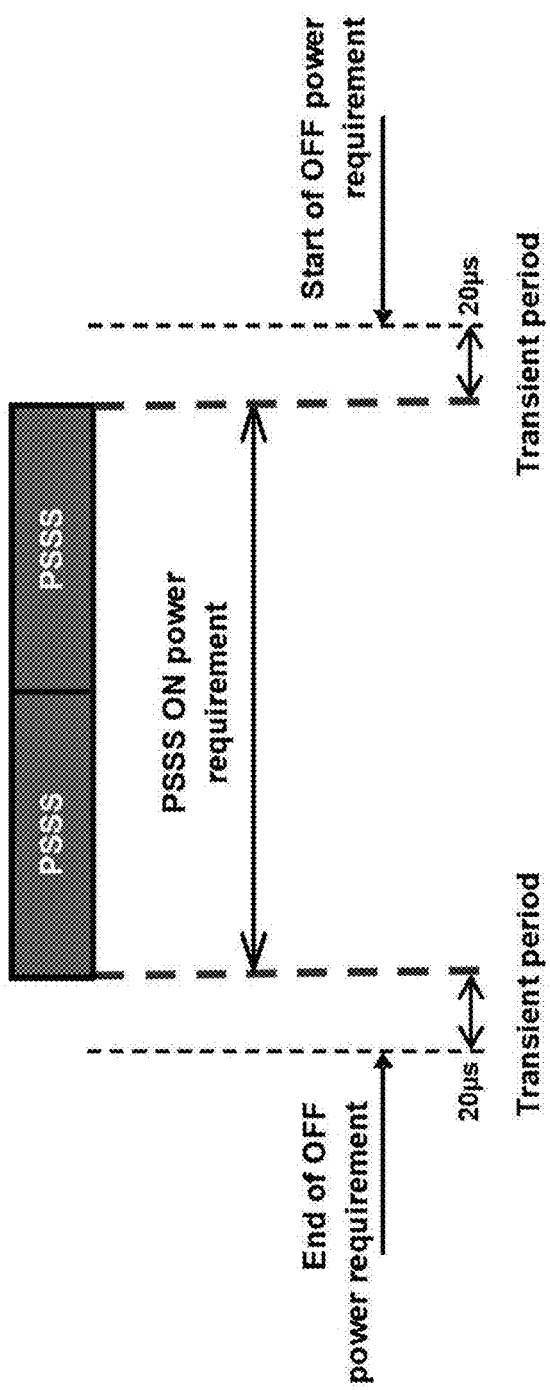
FIG. 8 illustrates a time mask for PSSS in a normal cyclic prefix (CP).

FIG. 8 illustrates a time mask for PSSS in a normal cyclic prefix (CP).

Referring to FIG. 8, the time mask for PSSS defines an observation period between OFF power and ON power and between ON power and OFF power for the PSSS transmitted in the subframe when not multiplexed with a PSBCH.

Figure 9:
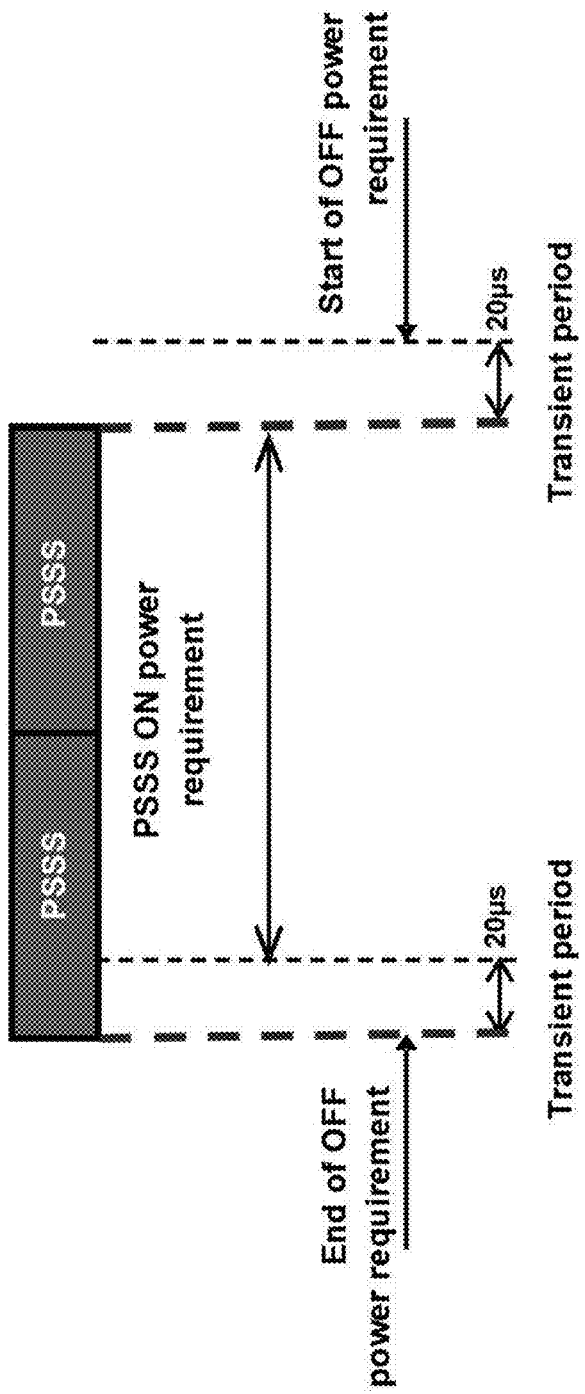
FIG. 9 illustrates a time mask for PSSS in an extended cyclic prefix (CP).

FIG. 9 illustrates a time mask for PSSS in an extended cyclic prefix (CP). Compared with FIG. 8, there is a difference in position of the transient period.

Figure 10:
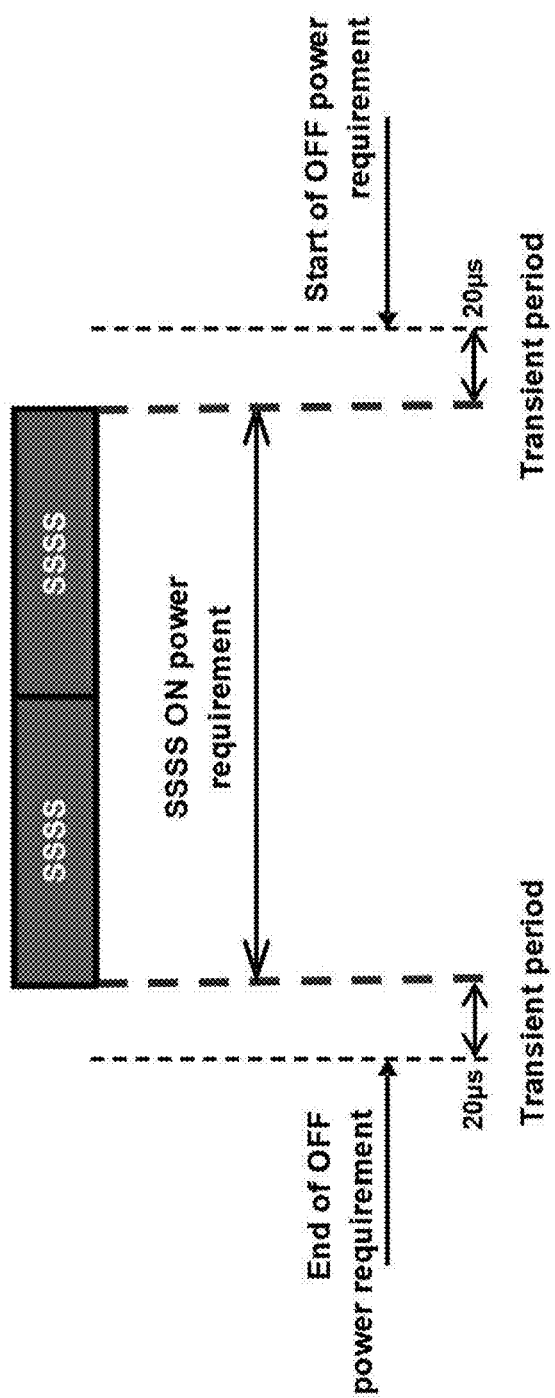
FIG. 10 illustrates a time mask for SSSS. The time mask for the SSSS may define an observation period between OFF power and ON power and between ON power and OFF power for the SSSS transmitted in a subframe when not multiplexed with the PSBCH.

FIG. 10 illustrates a time mask for SSSS. The time mask for the SSSS may define an observation period between OFF power and ON power and between ON power and OFF power for the SSSS transmitted in a subframe when not multiplexed with the PSBCH.

Figure 11:
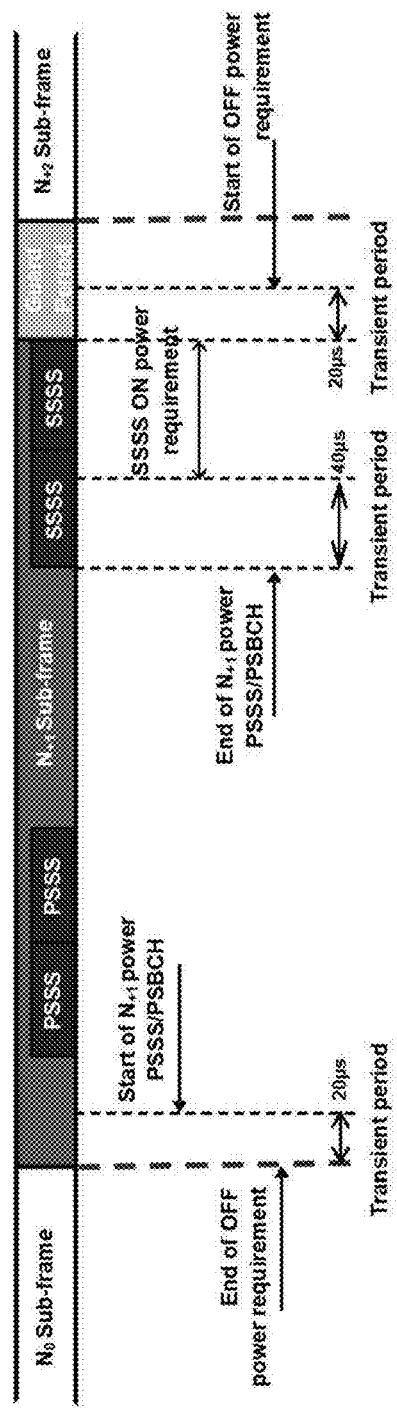
FIG. 11 illustrates a time mask for a PSSS/SSSS/PSBCH in a normal CP.

FIG. 11 illustrates a time mask for a PSSS/SSSS/PSBCH in a normal CP.

Referring to FIG. 11, the time mask for the PSSS/SSSS/PSBCH may define an observation period between SSSS and PSSS/PSBCH symbols in a subframe in which a last symbol is punctured to generate a guard period.

Figure 12:
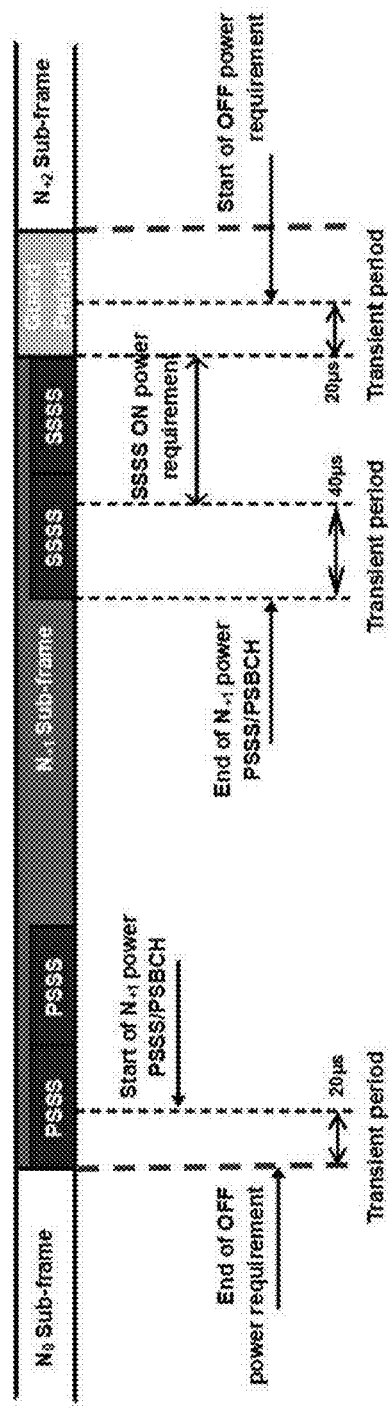
FIG. 12 illustrates a time mask for the PSSS/SSSS/ PSBCH in an extended CP.

FIG. 12 illustrates a time mask for the PSSS/SSSS/PSBCH in an extended CP.

Referring to FIG. 12, the time mask for the PSSS/SSSS/PSBCH may define an observation period between the SSSS and the PSSS/PSBCH symbols in a subframe in which a last symbol is punctured to generate a guard period.

Although not shown, the PSSCH/SRS time mask may define an observation period between a sounding reference signal (SRS) and a PSSCH symbol and a next subframe.

Hereinafter, the present invention will be described.

When V2X communication is performed in a relatively high frequency band (e.g., 6 GHz) and at a high speed (e.g., up to 140 KM/H), channel estimation performance based on a predefined or signaled reference signal (RS) (e.g., a demodulation reference signal (DM-RS)) may be reduced/lowered due to phase drift (which is generated due to a 'frequency offset' and 'Doppler effect') and 'inter-carrier interference (ICI)'.

In order to solve this problem, density (/number) of reference signals (e.g., 'DM-RS') used for channel estimation may be increased. Then, 'phase offset' correction and the channel estimation performance may be improved.

FIGS. 13 to 17 are examples of increasing density of the reference signals used for channel estimation in V2X communication.

Figure 13:
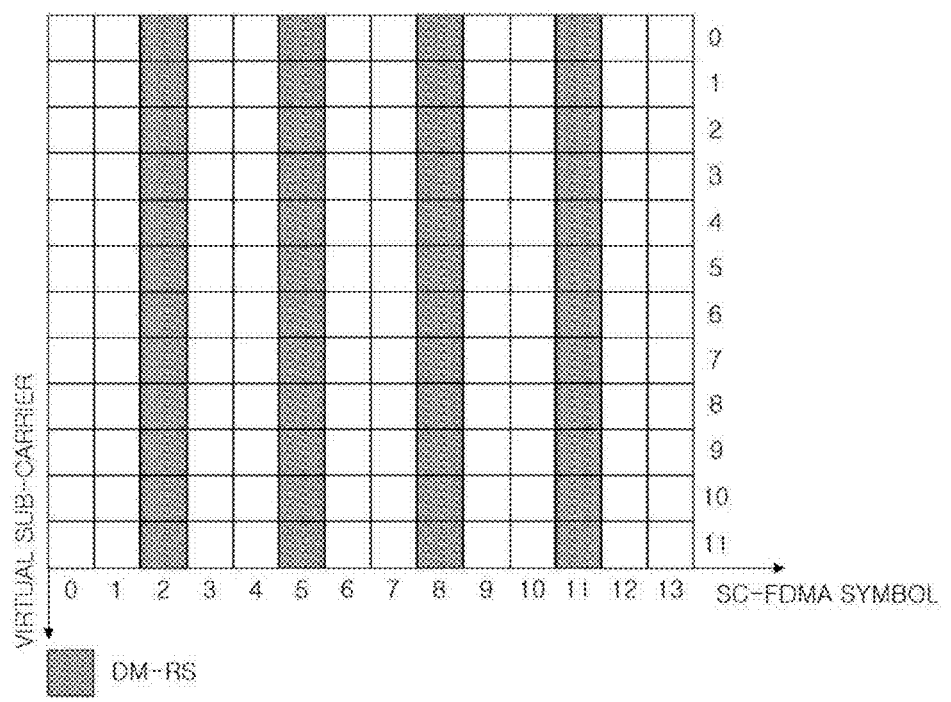
FIGS. 13 to 17 are examples of increasing density of the reference signals used for channel estimation in V2X communication.

Referring to FIG. 13, when a symbol index starts from 0, the DM-RSs may be transmitted in symbols #2, 5, 8, and 11 in a subframe.

Figure 14:
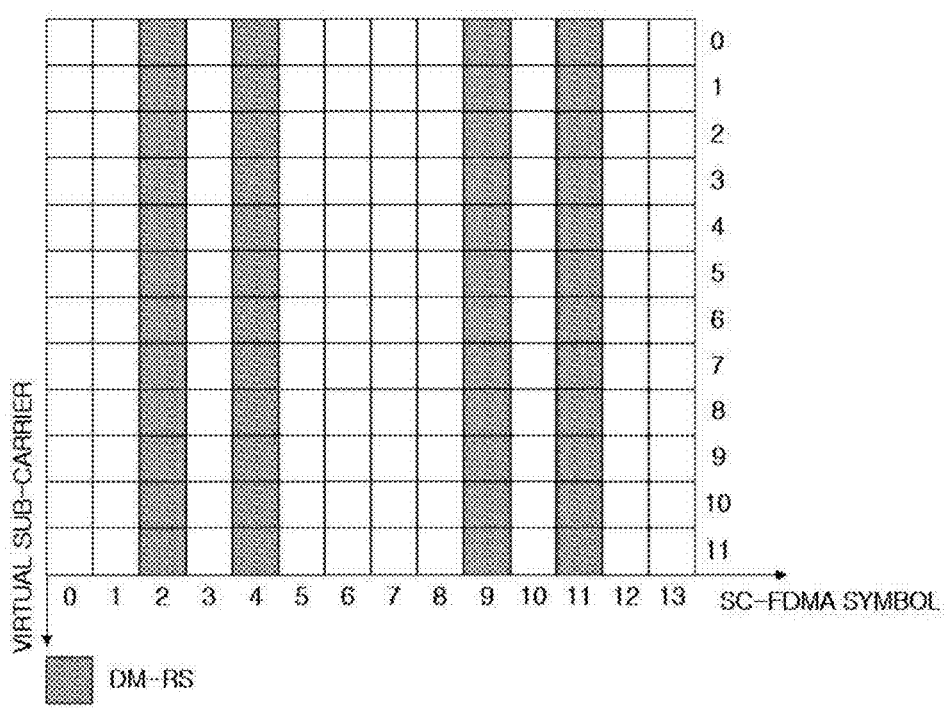

Referring to FIG. 14, when a symbol index starts from 0, the DM-RSs may be transmitted in symbols #2, 4, 9, and 11 in a subframe.

Figure 15:
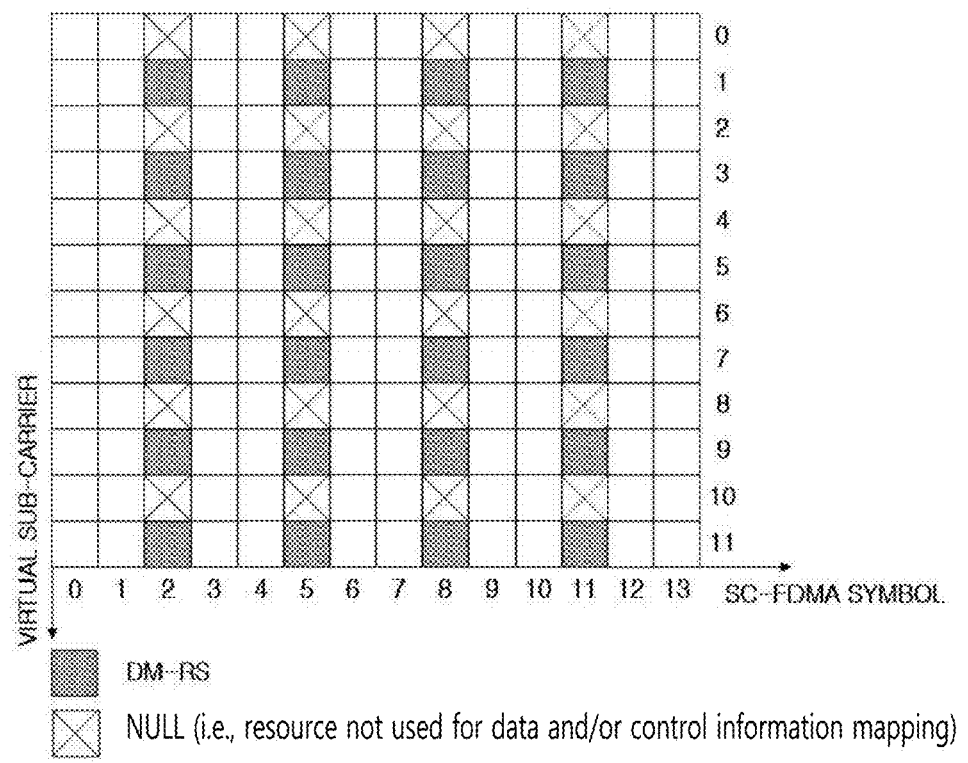

Referring to FIG. 15, when a symbol index starts from 0, the DM-RSs may be transmitted in symbols #2, 5, 8, and 11 in a subframe and data and/or control information may not be mapped to some resource elements (REs) in the symbols. FIGS. 13 and 14 are different from FIG. 15, in that data and/or control information is not mapped to symbols in which the DM-RSs are transmitted.

Figure 16:
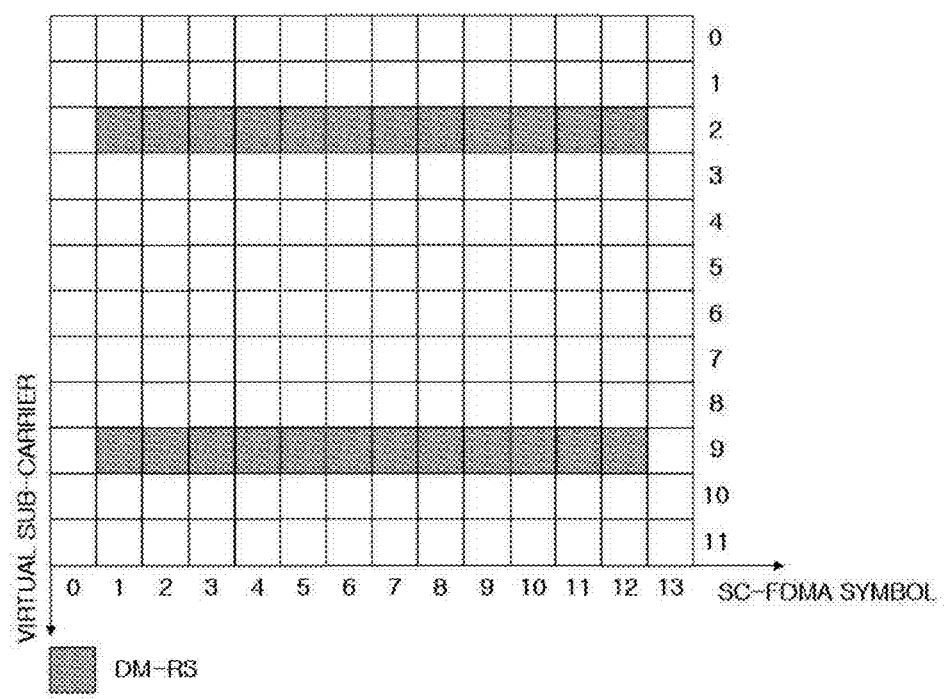

Referring to FIG. 16, in a time domain, when a symbol index starts from 0, the DM-RSs are transmitted in symbols #1 to #12 in a subframe. In the frequency domain, the DM-RSs are transmitted only on subcarriers #2 and #9.

Figure 17:
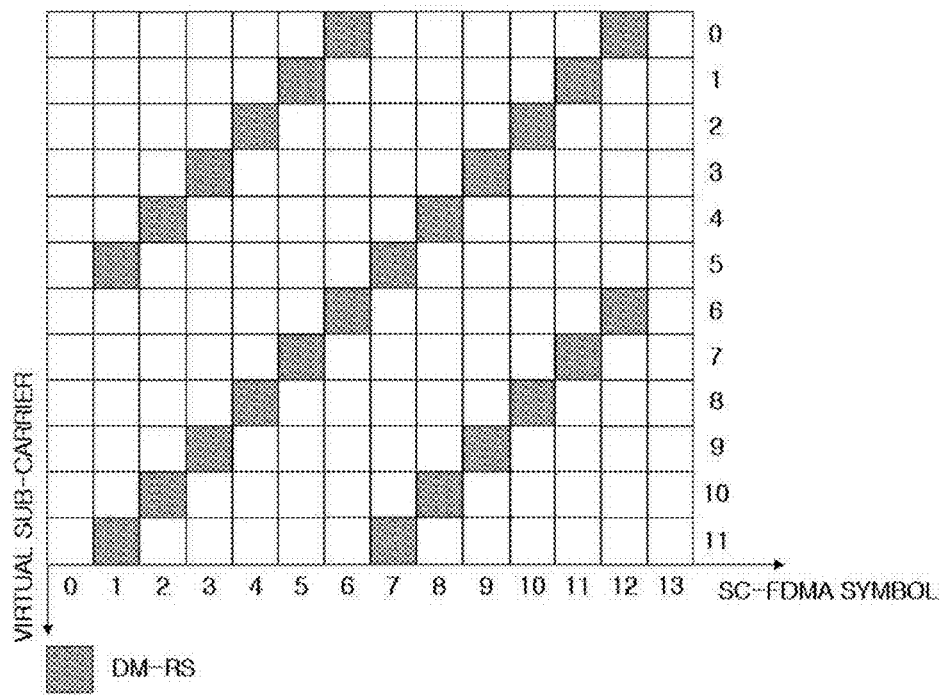

Referring to FIG. 17, in a time domain, when a symbol index starts from 0, DM-RSs are transmitted in symbols #1 to #12 in a subframe. In the frequency domain, DM-RS is transmitted only in subcarriers # n and n+6. Here, n may be one of integers 0 to 5.

The following proposed methods propose a method of effectively defining "(power) transient period" (and/or "(power) ON/OFF time mask") when 'primary sidelink synchronization signal (PSSS)/secondary sidelink synchronization signal (SSSS)/physical sidelink broadcast signal (PSBCH)' are multiplexed (together) and transmitted on predefined or signaled specific (one) 'reference signal (subframe) structure'.

In the following description, an 'OFDM similar reference signal (subframe) structure' is assumed or a 'PSBCH' (transmission) situation breaking the 'SC-FDM structure' is assumed, and in order to solve the problem of increasing 'cubic metric (CM) (and/or peak-to-average power ratio (PAPR), it is assumed that additional 'maximum power reduction (MPR)' (or 'maximum power backoff') is applied to 'PSBCH transmission power'.

For example, the proposed schemes of the present invention are (all) applicable when a plurality of channels/signals set/determined as different 'transmission power' are transmitted on one subframe. For example, the (some or all) proposed methods of the present invention may extend even in a communication environment (uplink or downlink) between a base station and a UE.

[Proposed method #1] The 'PSSS/SSSS/PSBCH'-related "(power) transient period" (and/or "(power) ON/OFF time mask") may be set according to all or some of rules below.

(Rule #1-1) In order to avoid performance degradation related to channel estimation, a specific channel/signal-related "(power) transient period" is not set (as much as possible) on a symbol used for "DM-RS". transmission.

(Rule #1-2) In order to avoid performance degradation related to transmission/reception of 'PSSS/SSSS', a specific channel/signal related "(power) transient period" may not be set (as possible).

(Rule #1-3) In order to avoid performance degradation related to transmission/reception of 'PSBCH', a specific channel/signal related "(power) transient period" is not set (as possible) on a symbol used for the 'PSBCH' transmission purpose.

Figure 18:
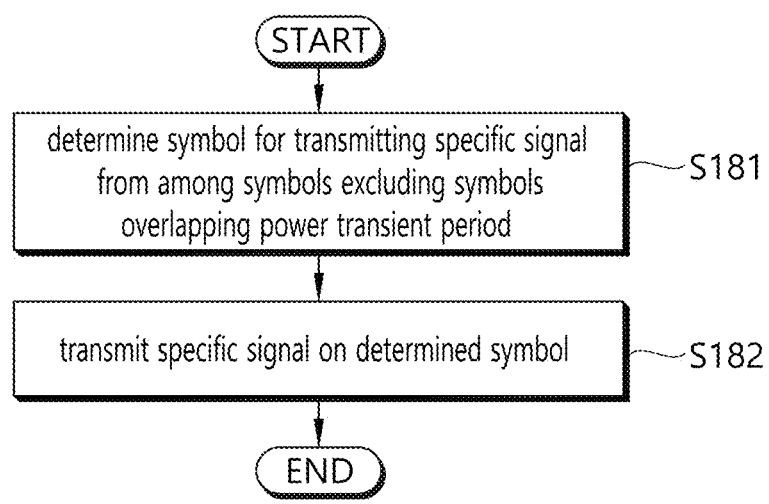
FIG. 18 illustrates a V2X signal transmission method according to an embodiment of the present invention.

FIG. 18 illustrates a V2X signal transmission method according to an embodiment of the present invention.

Referring to FIG. 18, the UE determines a symbol for transmitting a specific signal, among symbols excluding a symbol overlapping a power transient period (S181).

The specific signal may include at least one of a demodulation reference signal (DM-RS), a side link synchronization signal, and a signal transmitted from a sidelink broadcast channel (PSBCH).

The power transient period may be a time period in which a transmission power-on state changes to a transmission power-off state or a time period in which the transmission power-off state changes to the transmission power-on state.

For example, when the UE desires to transmit a specific signal such as the DM-RS, the PSSS/SSSS, or the PSBCH for V2X communication, the UE transmits the signal in some or all of symbols not overlapping the power transient period that occurs due to the change in ON/OFF state.

The determined symbols may be determined from among symbols excluding symbols overlapping the power transient period in a subframe (normal CP) including 14 symbols. In the extended CP, symbols may be determined from among symbols excluding the symbols overlapping the power transient period in a subframe including 12 symbols.

The UE transmits the specific signal in the determined symbol (S182).

When the specific signal includes a side link reference signal and a signal transmitted on the sidelink broadcast channel (PSBCH), transmission power for the side link reference signal and the signal transmitted on the PSBCH may be set to be equal. This may be to reduce the generation number of power transient periods.

Figure 19:
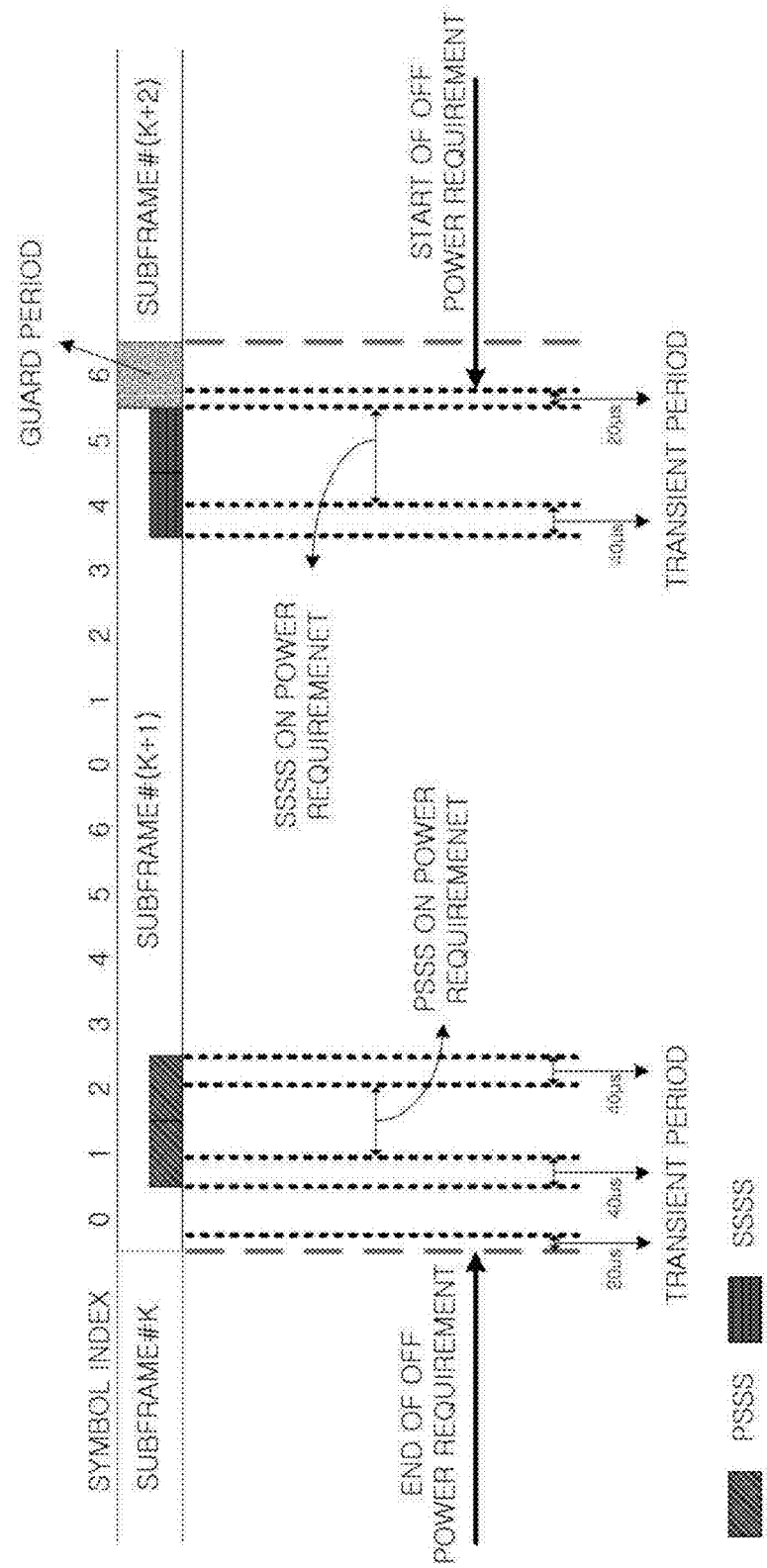
FIGS. 19 to 22 are diagrams illustrating setting of the 'PSSS/SSSS/PSBCH' related "(power) transient period" (and/or "(power) ON/OFF time mask") multiplexed and transmitted together on one subframe.
Figure 20:
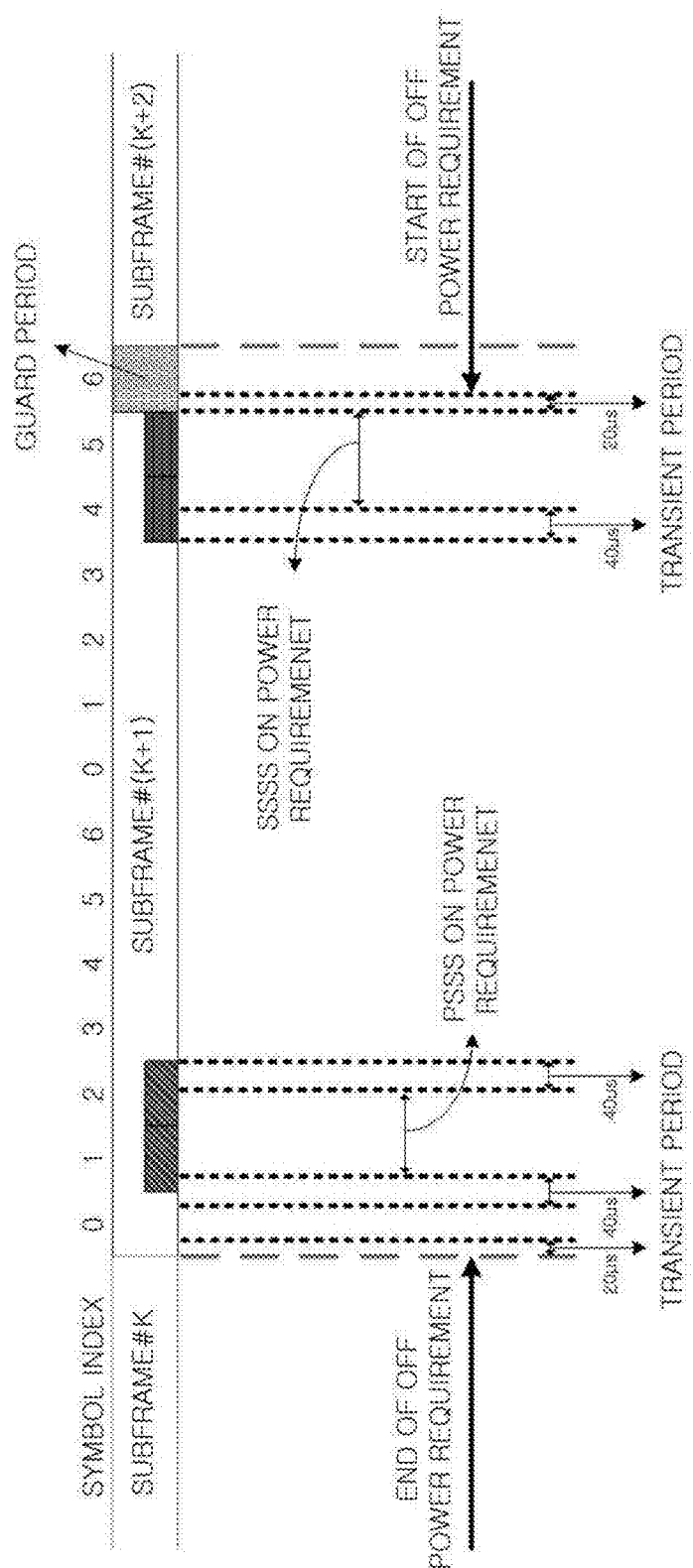
Figure 21:
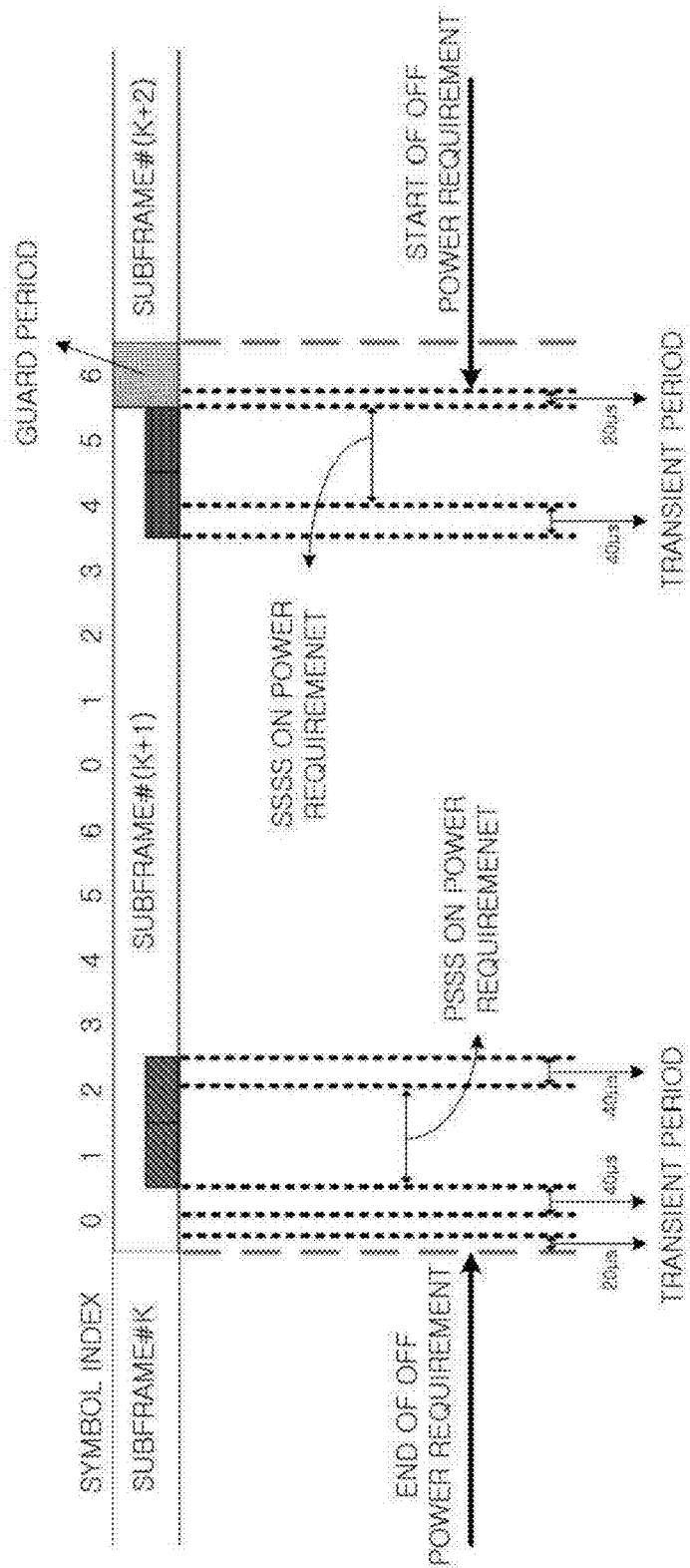

FIGS. 19 to 22 are diagrams illustrating setting of the 'PSSS/SSSS/PSBCH' related "(power) transient period" (and/or "(power) ON/OFF time mask") multiplexed and transmitted together on one subframe. In FIG. 19, the portion denoted by PSSS, the portion denoted by SSSS sequentially represent the PSSS and the SSSS in all the drawings hereinafter unless otherwise indicated.

For example, it is assumed that, when the 'normal CP' is set, the reference signal DM-RS is present/transmitted on the 'third symbol' of the 'first/second slot', and it is assumed that, when the 'extended CP' is set, the reference signal DM-RS is present(transmitted) on the 'second symbol' of the 'first/second slot'.

Figure 22:
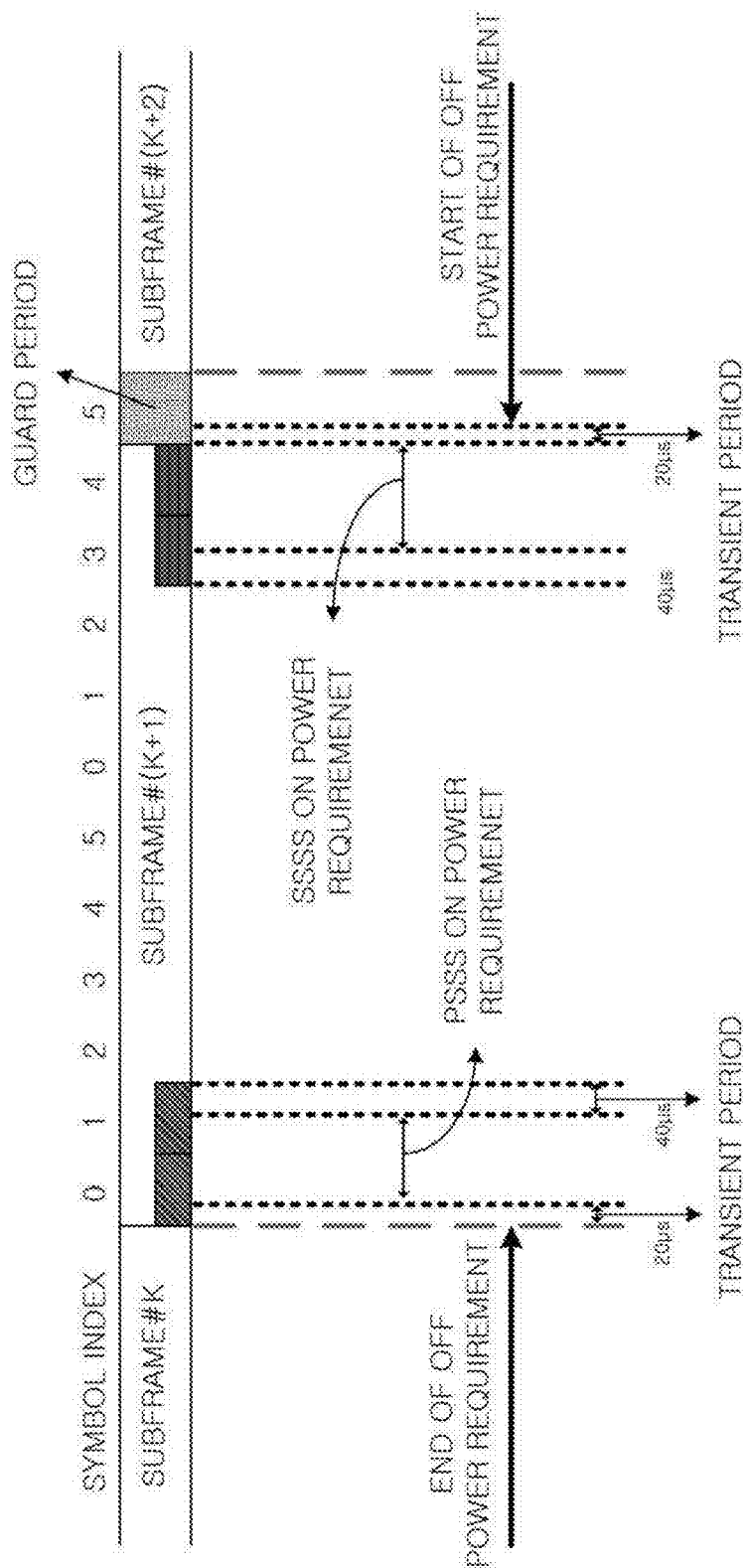
Figure 23:
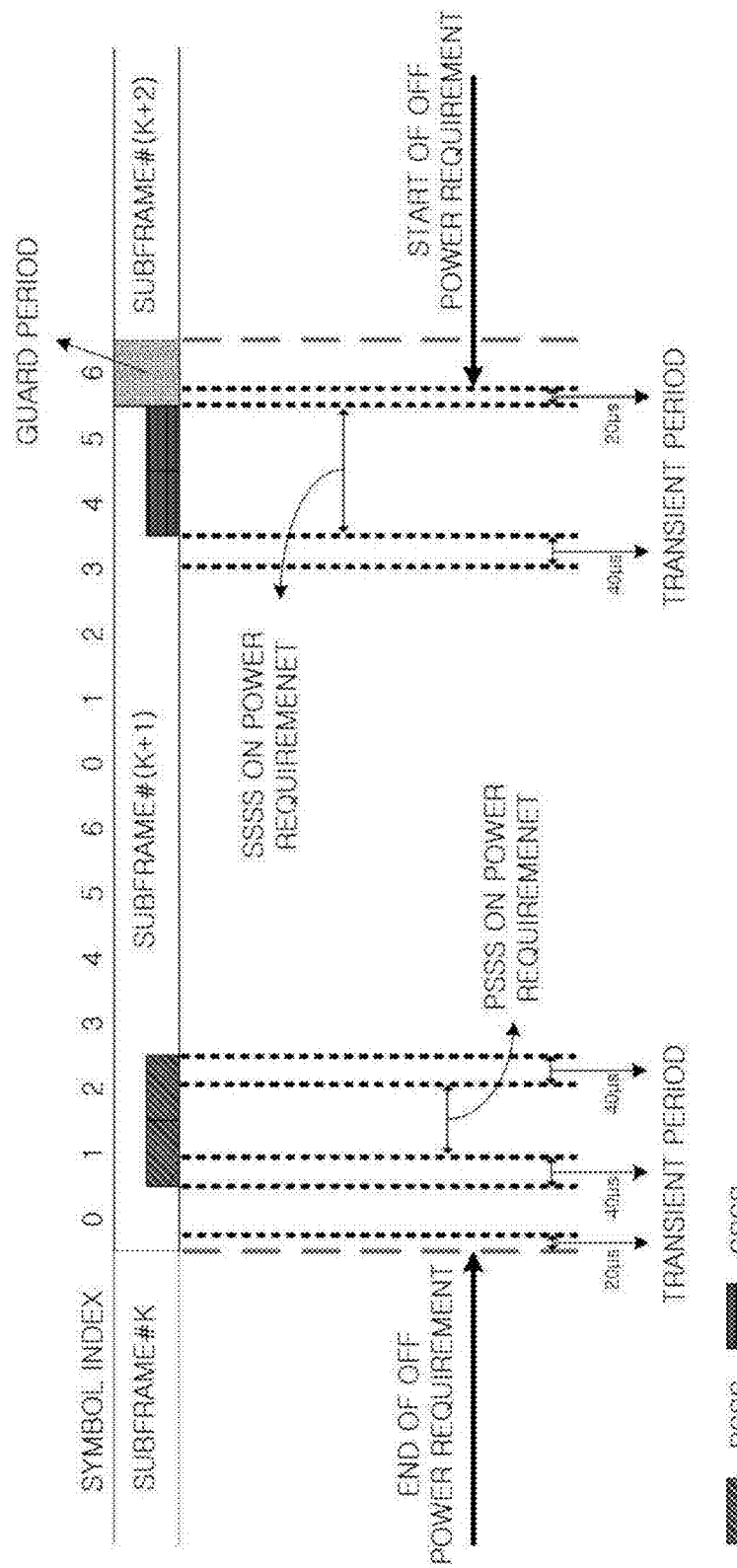
FIGS. 23 to 30 are views illustrating examples of setting 'PSSS/SSSS/PSBCH' related "(power) transient period" (and/or "(power) ON/OFF time masks") multiplexed and transmitted together on one subframe.
Figure 24:
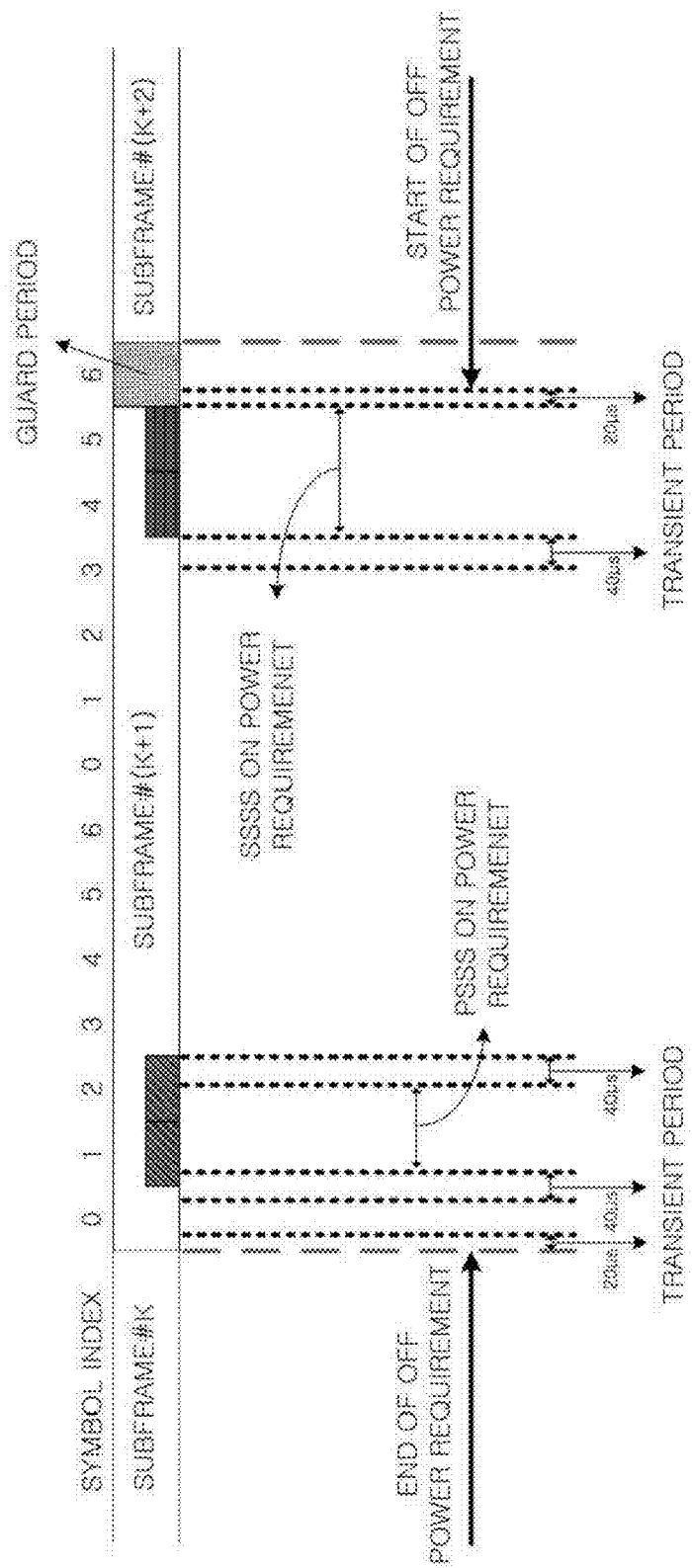

FIG. 19/FIG. 22 illustrate cases to which (Rule #1-1)/(Rule #1-3) sequentially described above are applied, and FIG. 21/FIG. 22 may be cases to which (Rule #1-1)/(Rule #1-2) described above are applied.

20/40 microseconds, represented by the values of the transient periods in FIGS. 19 to 22 are only one example, and other values of (power) transient periods may be set/ defined.

FIGS. 23 to 30 are views illustrating examples of setting 'PSSS/SSSS/PSBCH' related "(power) transient period" (and/or "(power) ON/OFF time masks") multiplexed and transmitted together on one subframe.

Here, for example, it is assumed that, when the 'normal CP' is set, the reference signal DM-RS is present (/transmitted) on a 'third symbol' of the 'first slot' and the reference signal DM-RS is not present (/transmitted) on a 'third symbol of the second slot, and it is assumed that, when the extended CP is set, the reference signal DM-RS is present (/transmitted) on the 'second symbol' of the 'first slot' and the reference signal DM-RS is not present (/transmitted) on the 'second symbol' of the 'second slot'. Under these assumptions, the methods (/rules) described above with reference to FIGS. 23 to 30 may be applied.

Figure 25:
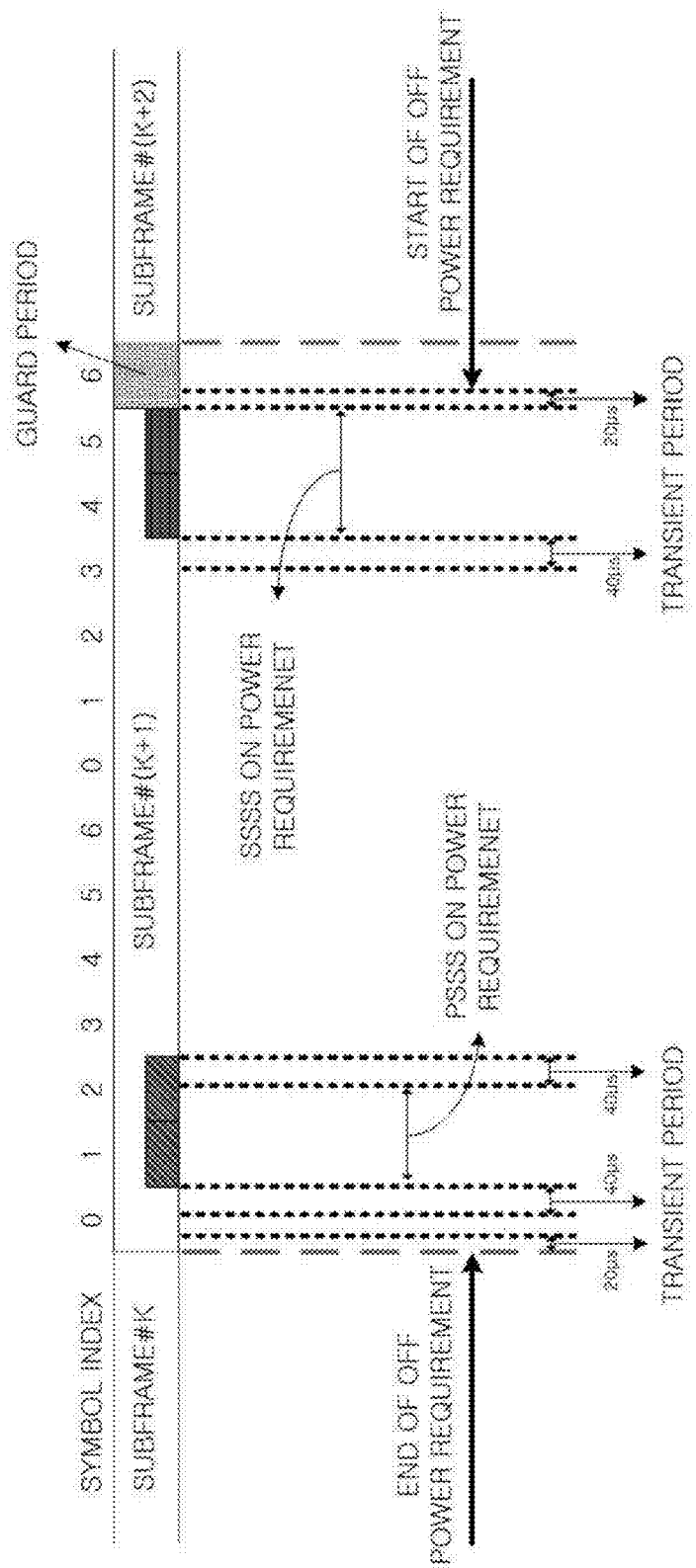
Figure 26:
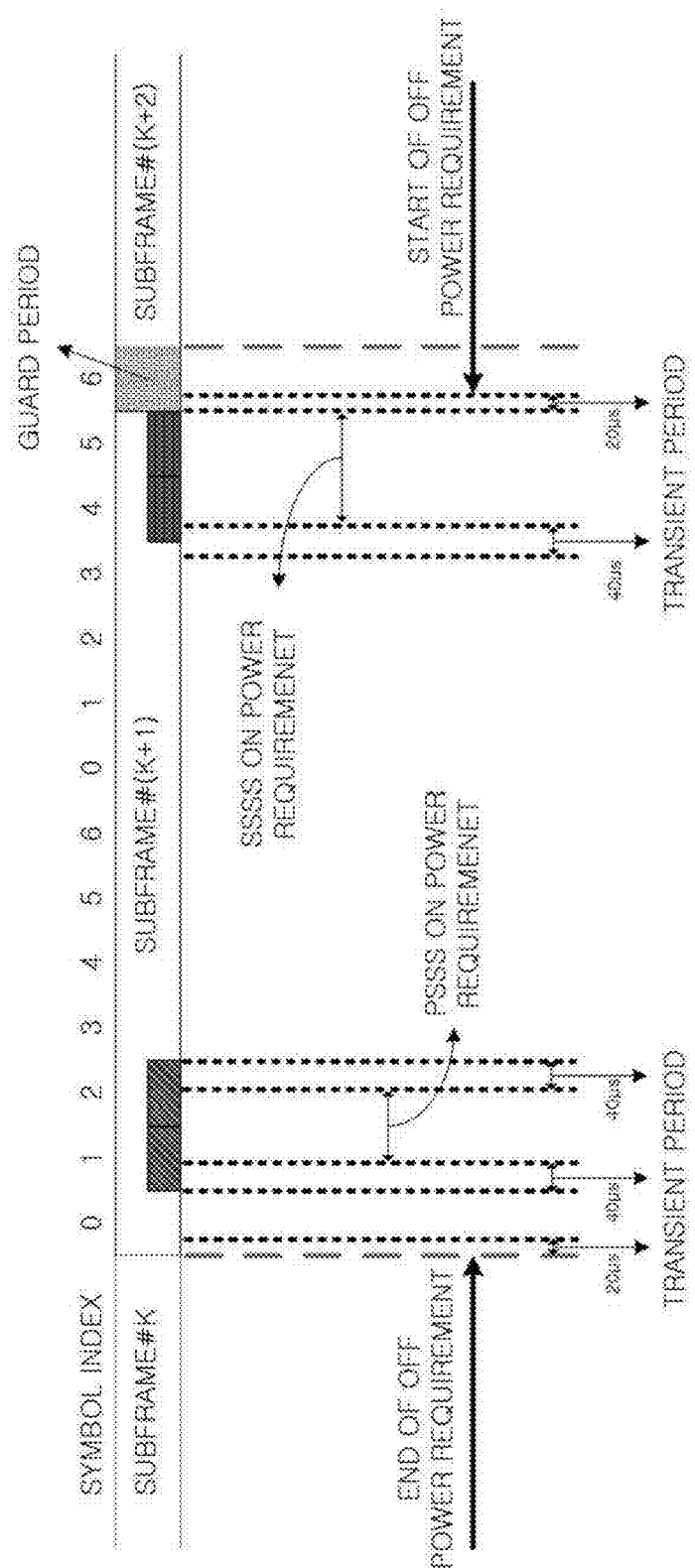
Figure 27:
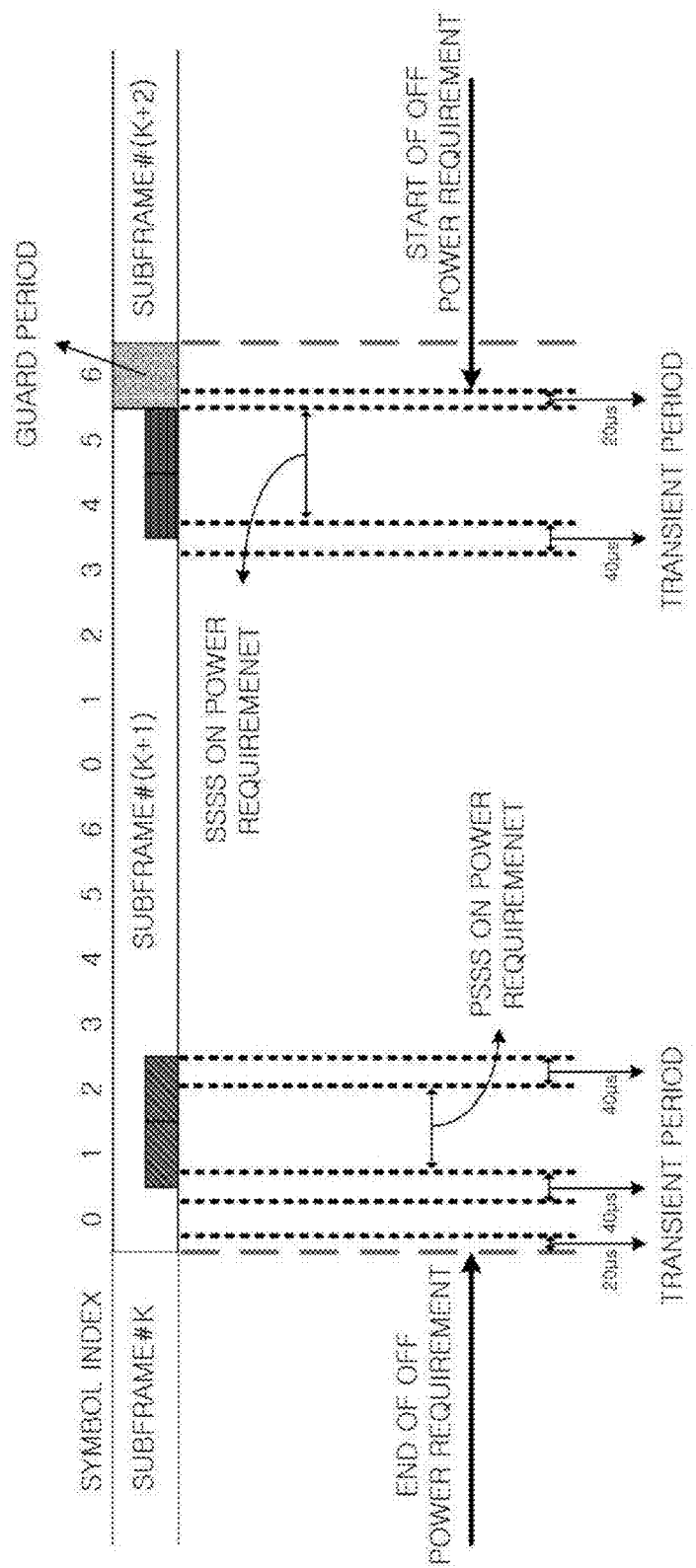
Figure 28:
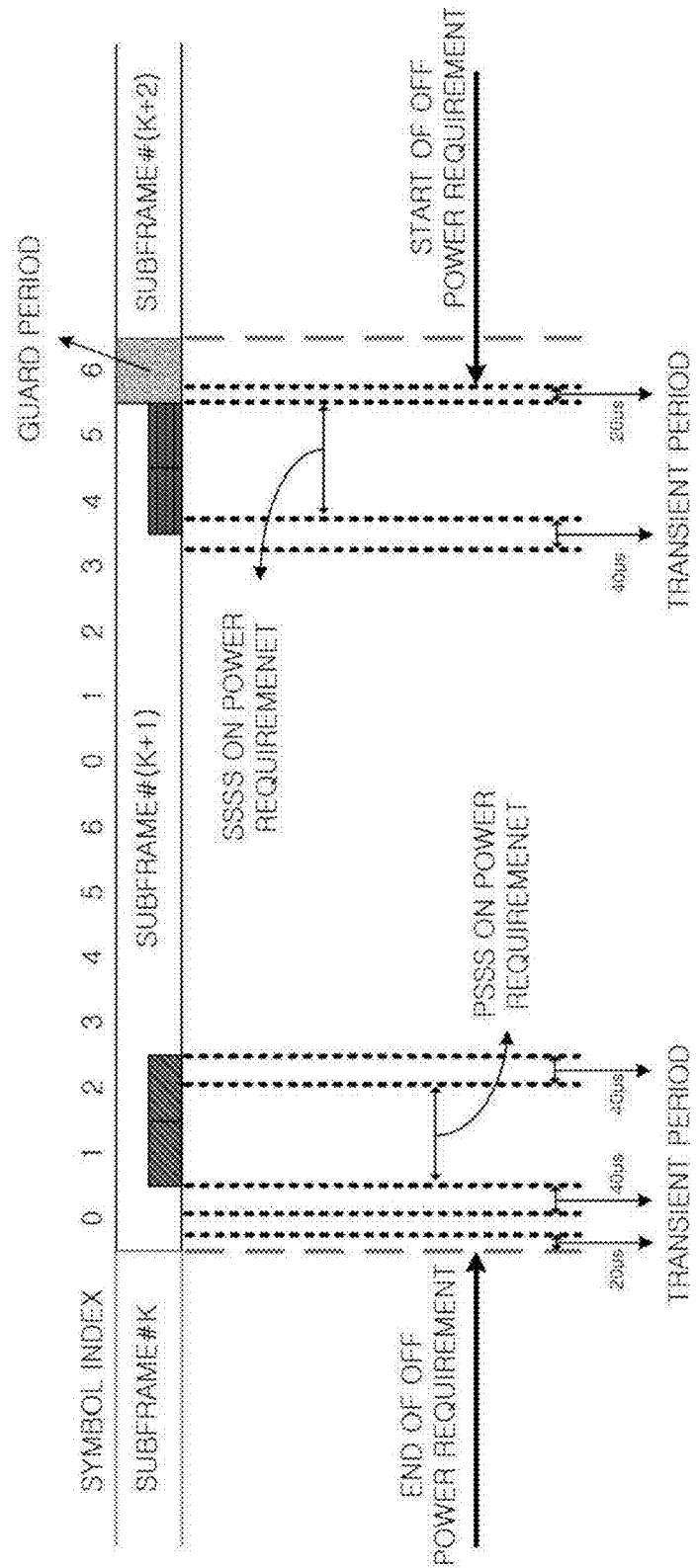
Figure 29:
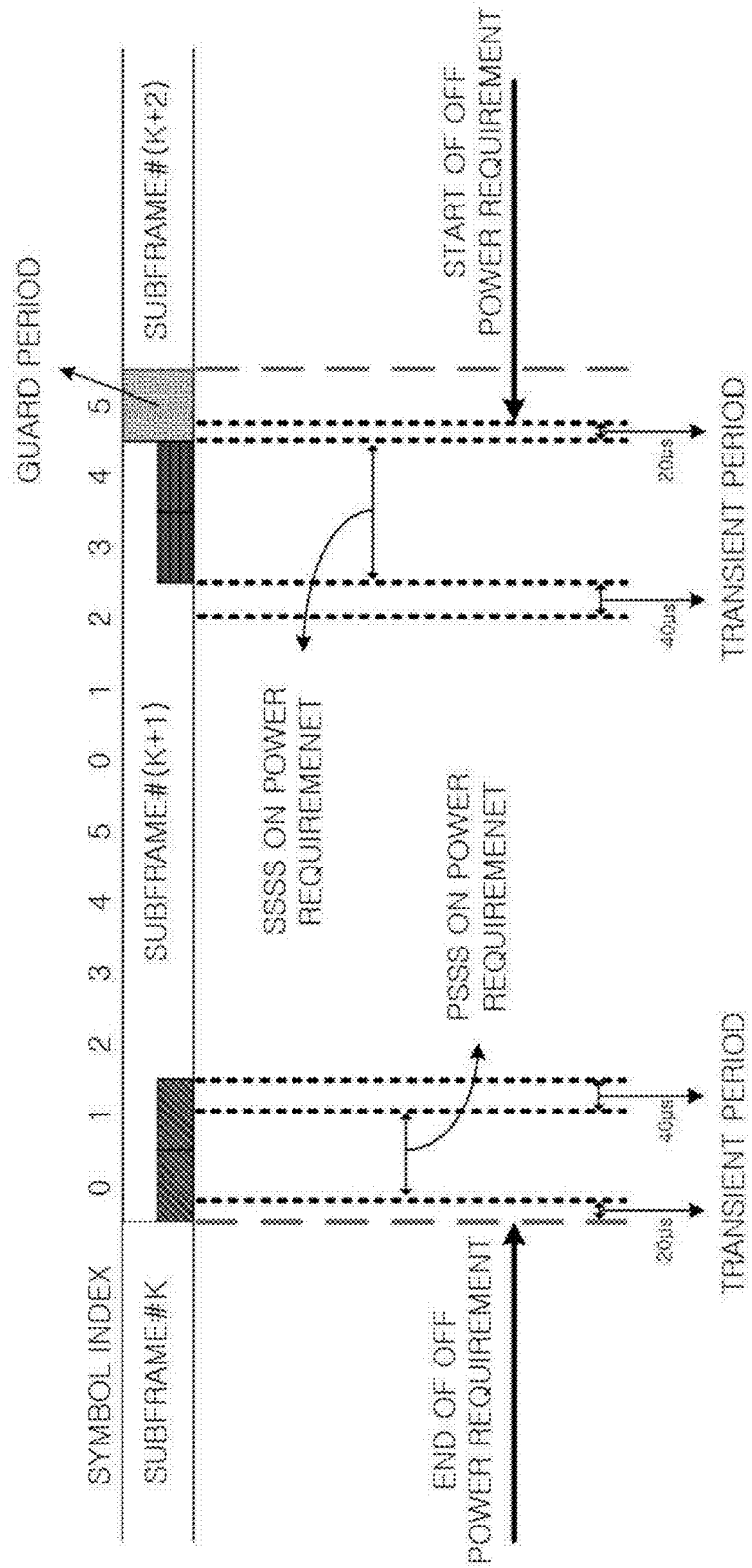
Figure 30:
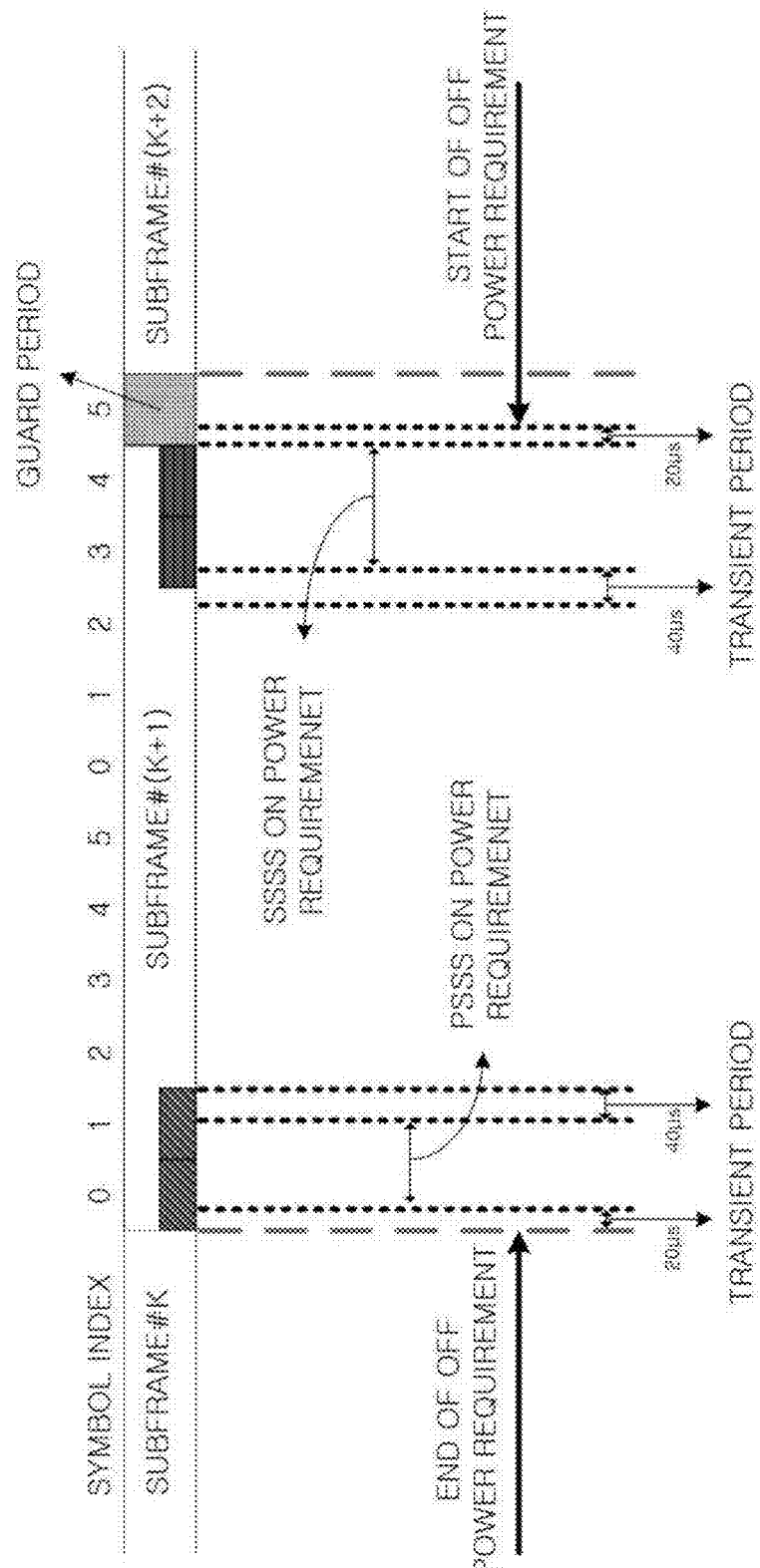
Figure 31:
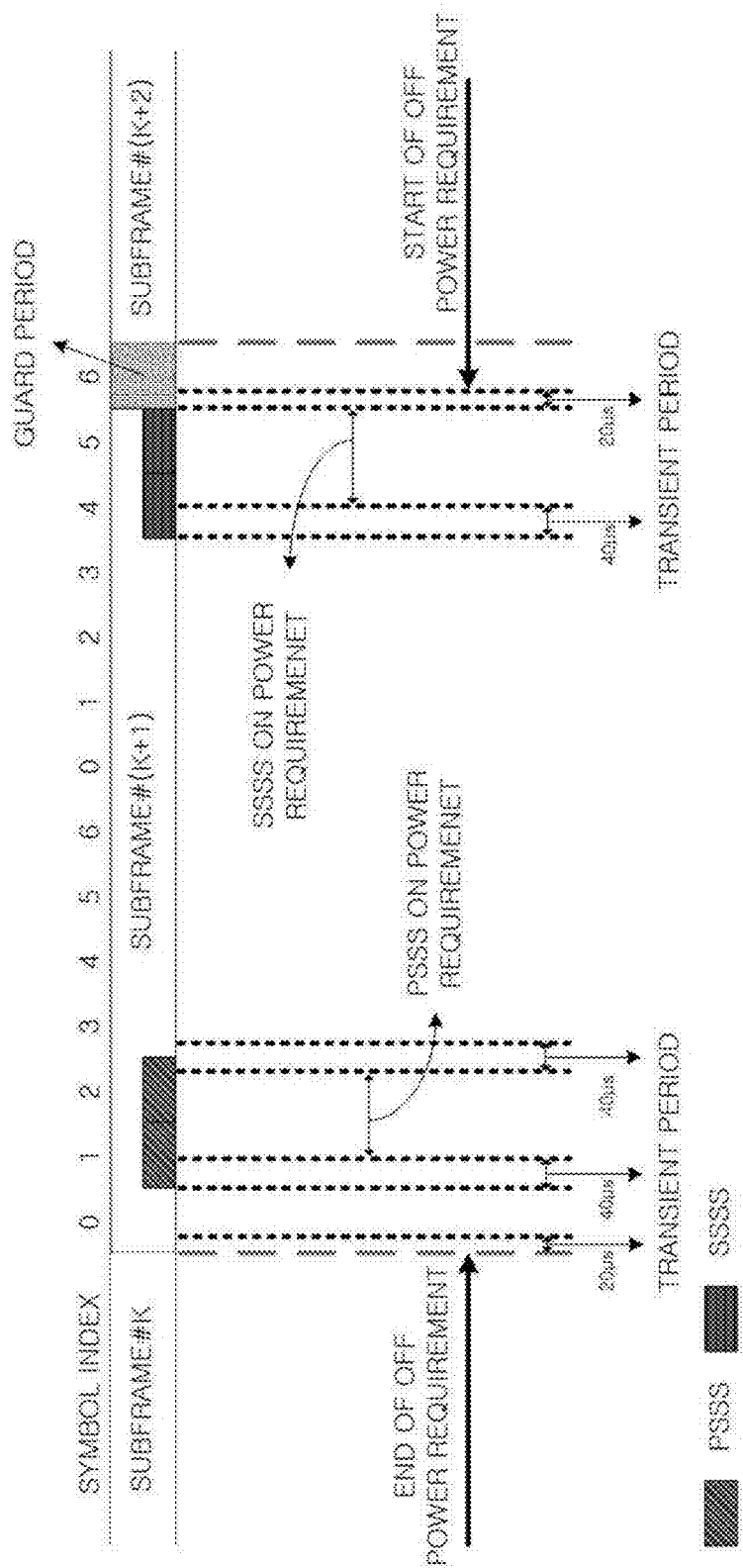
FIGS. 31 to 54 are views illustrating setting of 'PSSS/ SSSS/PSBCH related "(power) transient period" (and/or "(power) ON/OFF time mask") multiplexed and transmitted together on one subframe.
Figure 32:
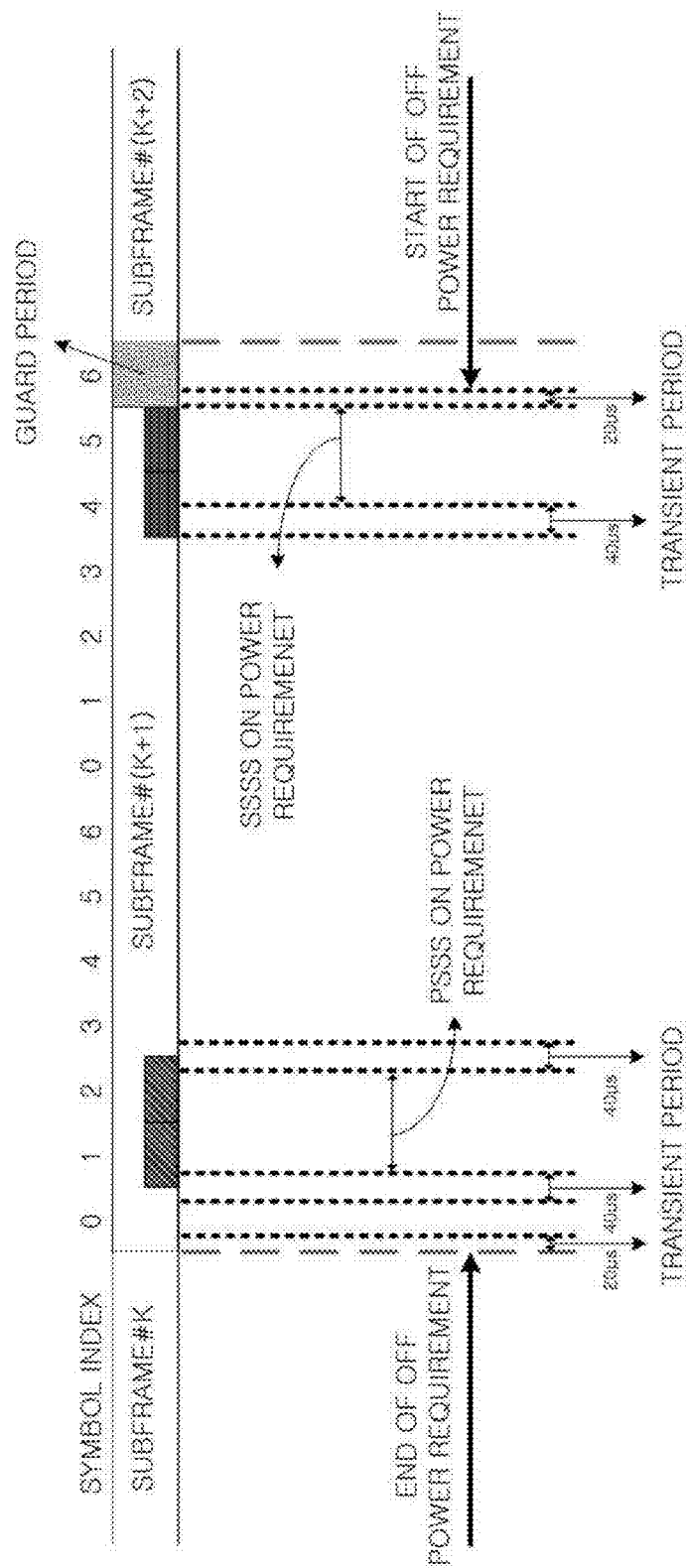
Figure 33:
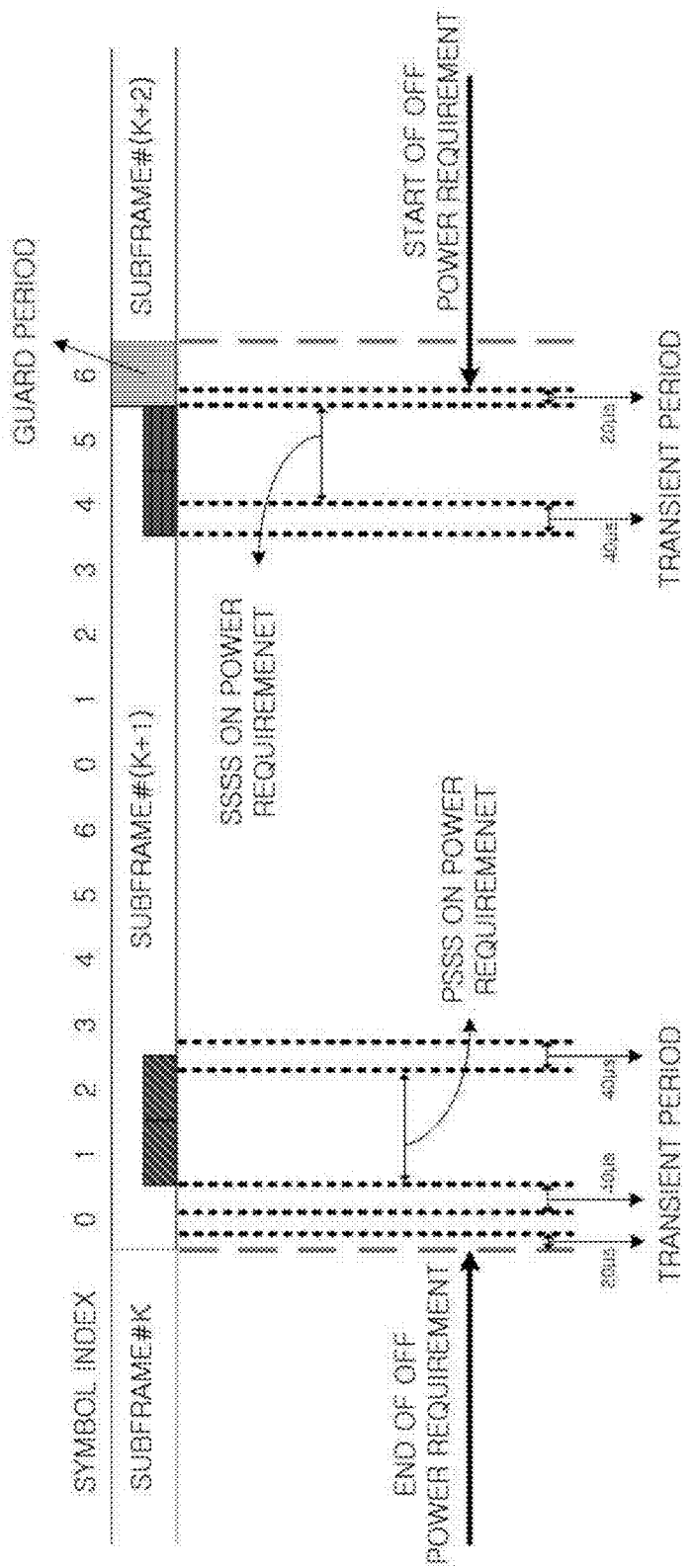
Figure 34:
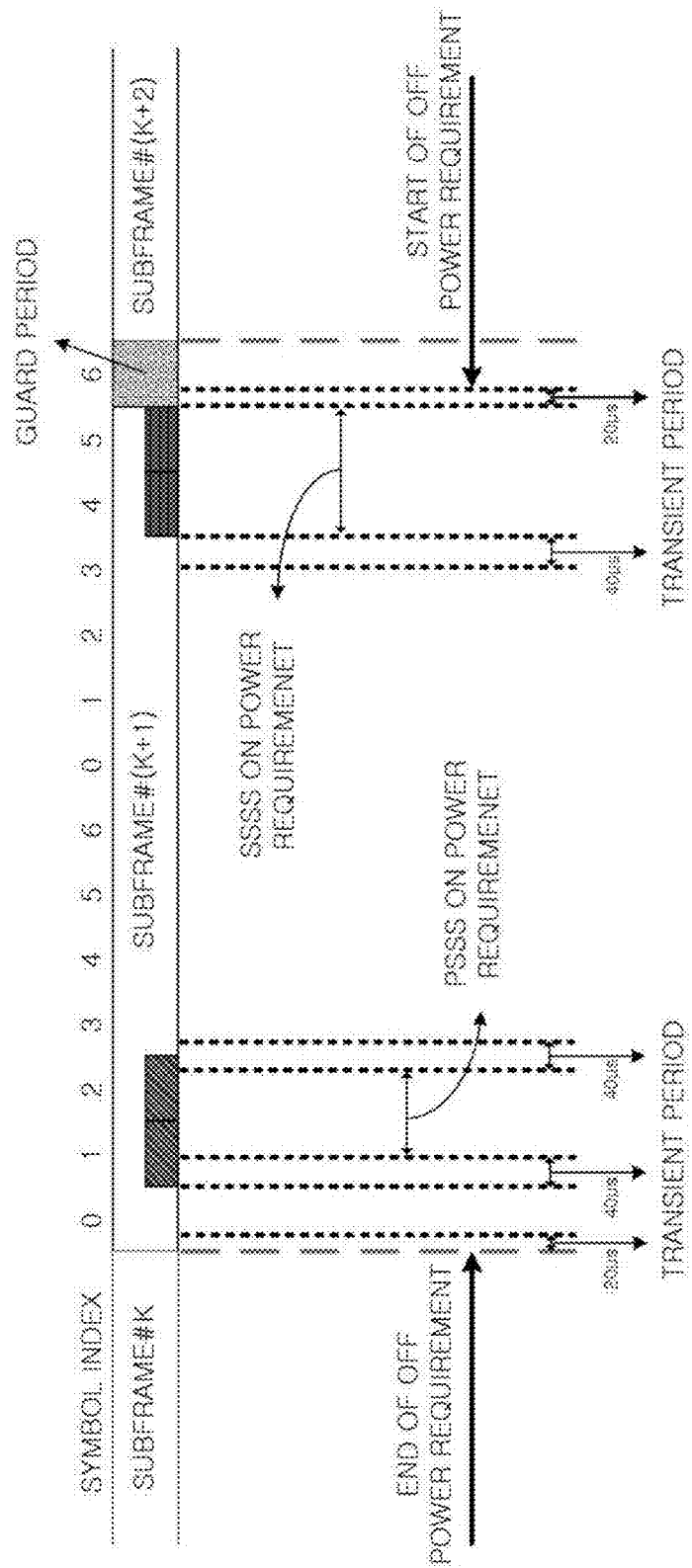
Figure 35:
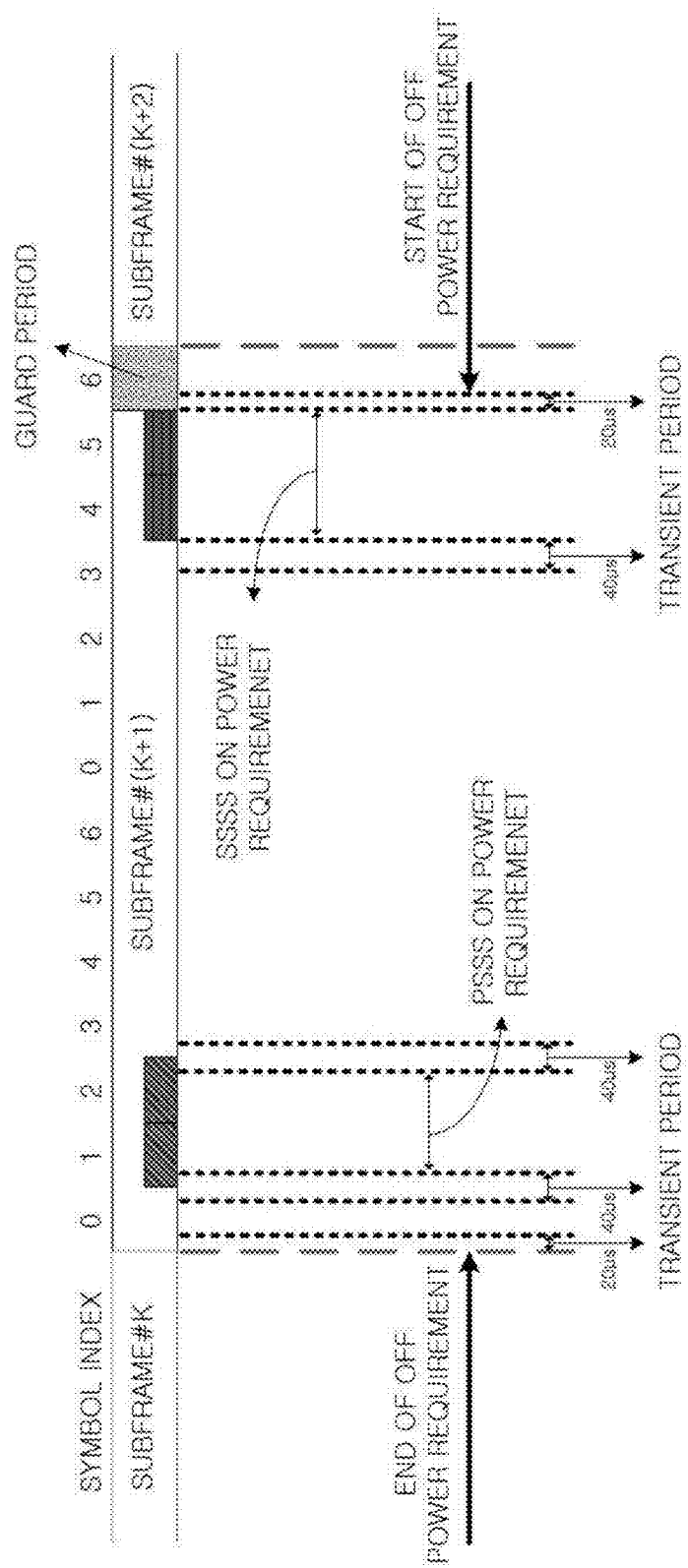
Figure 36:
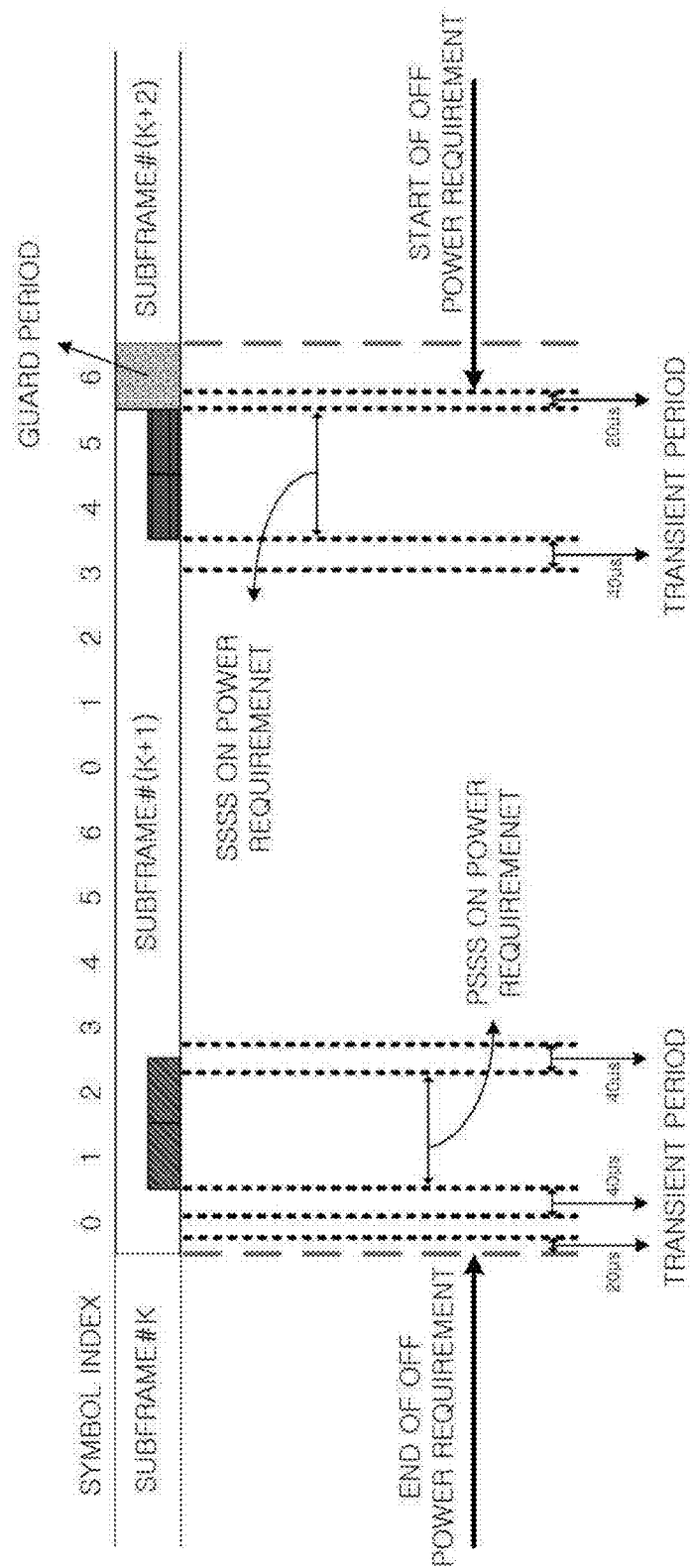
Figure 37:
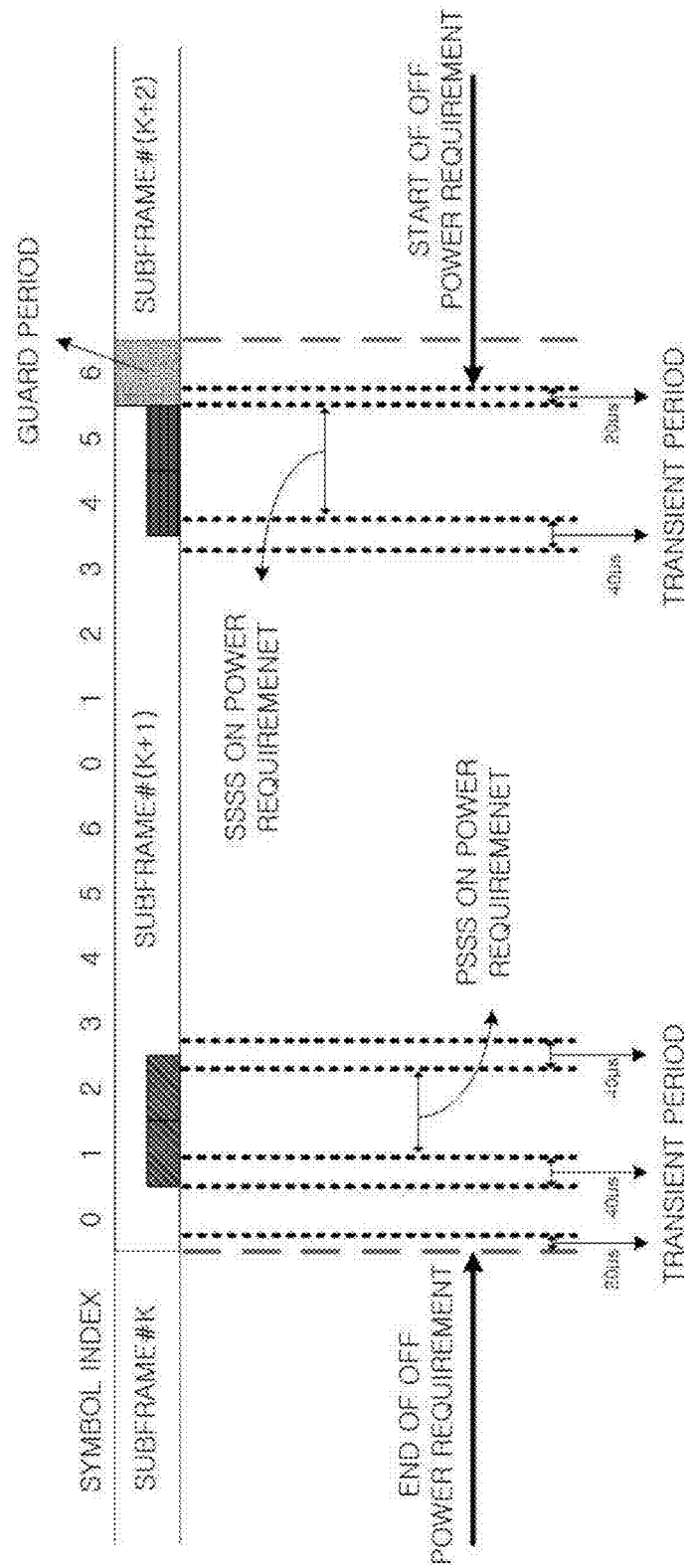
Figure 38:
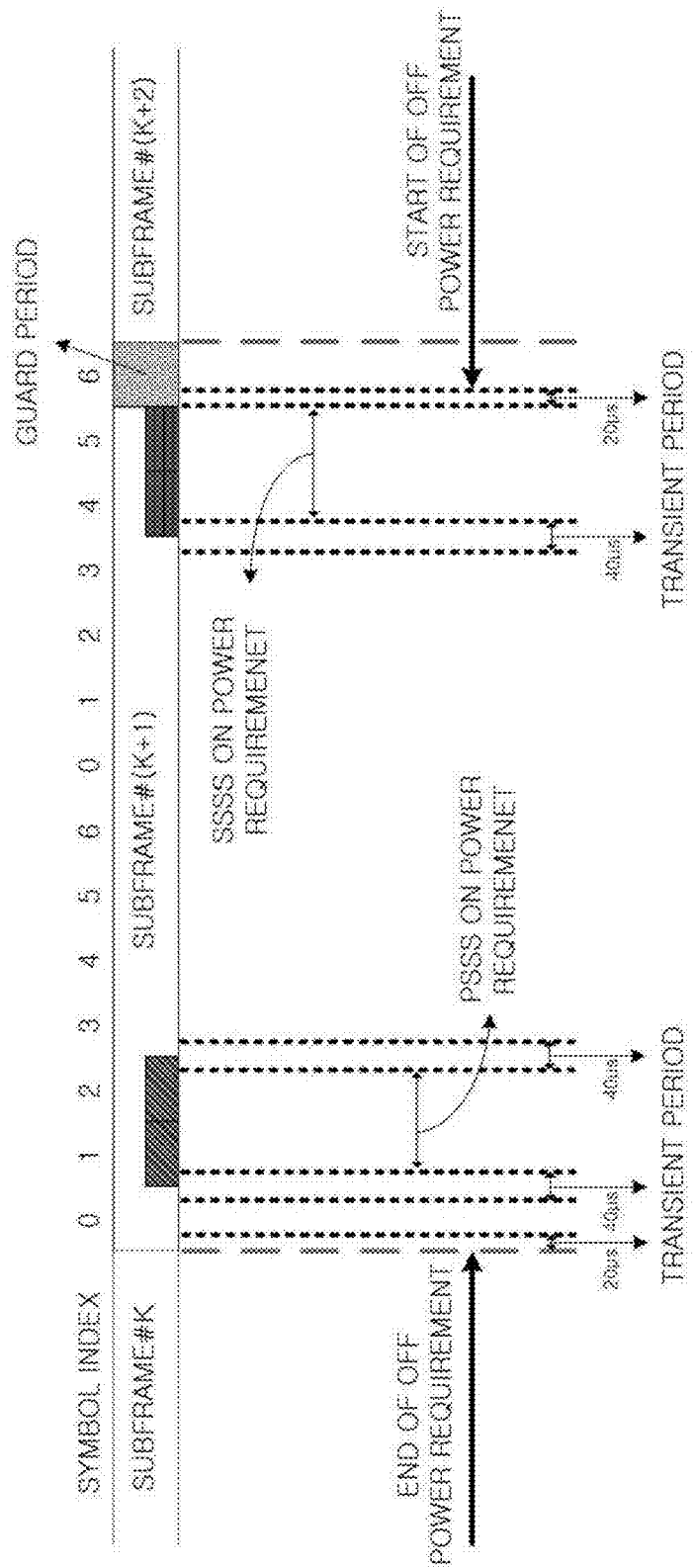
Figure 39:
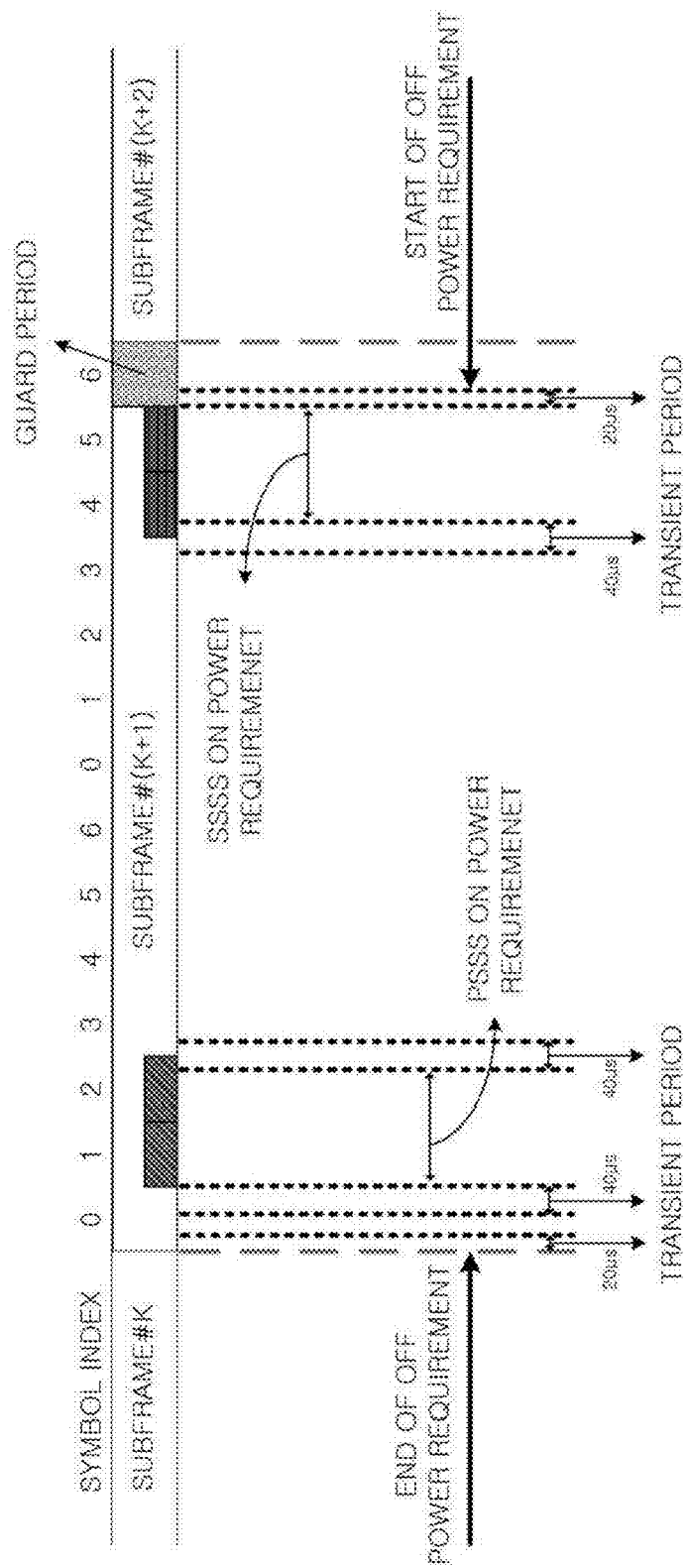
Figure 40:
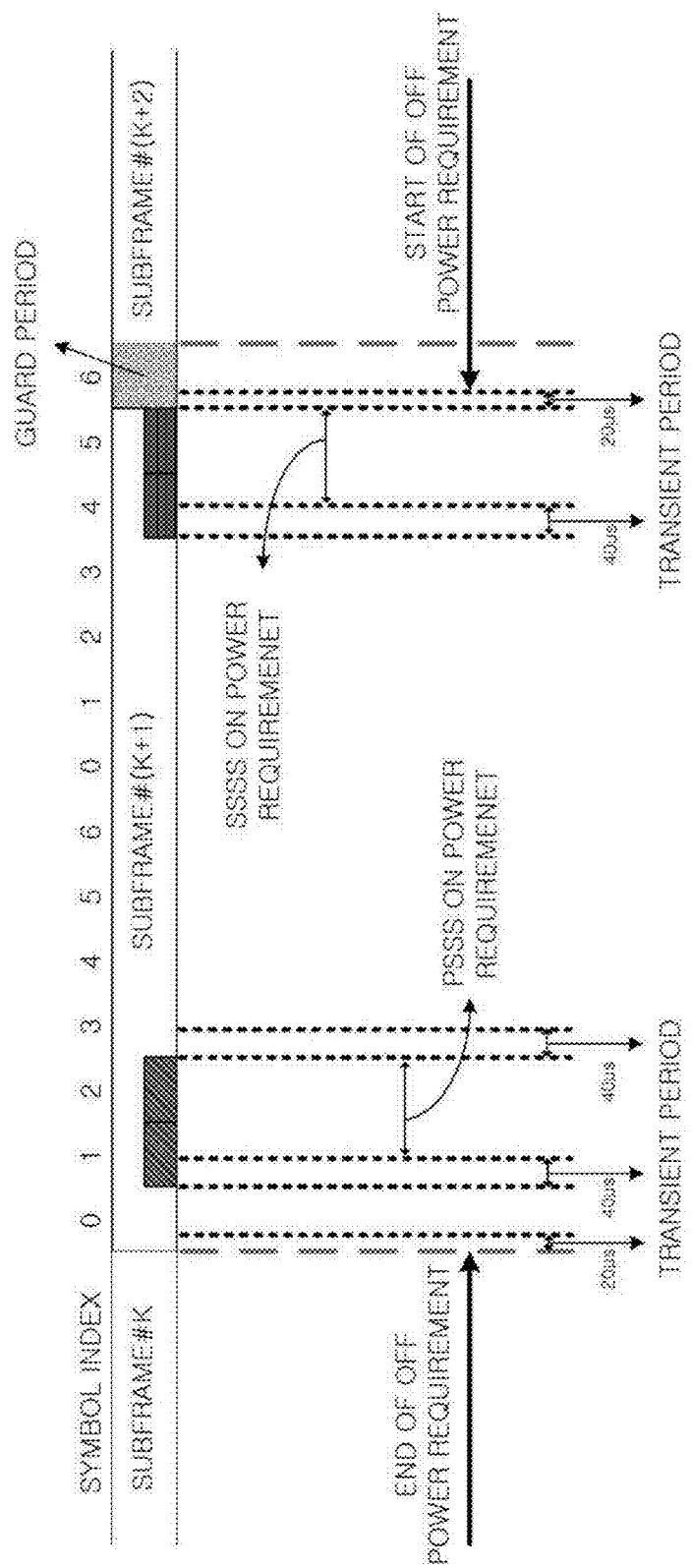
Figure 41:
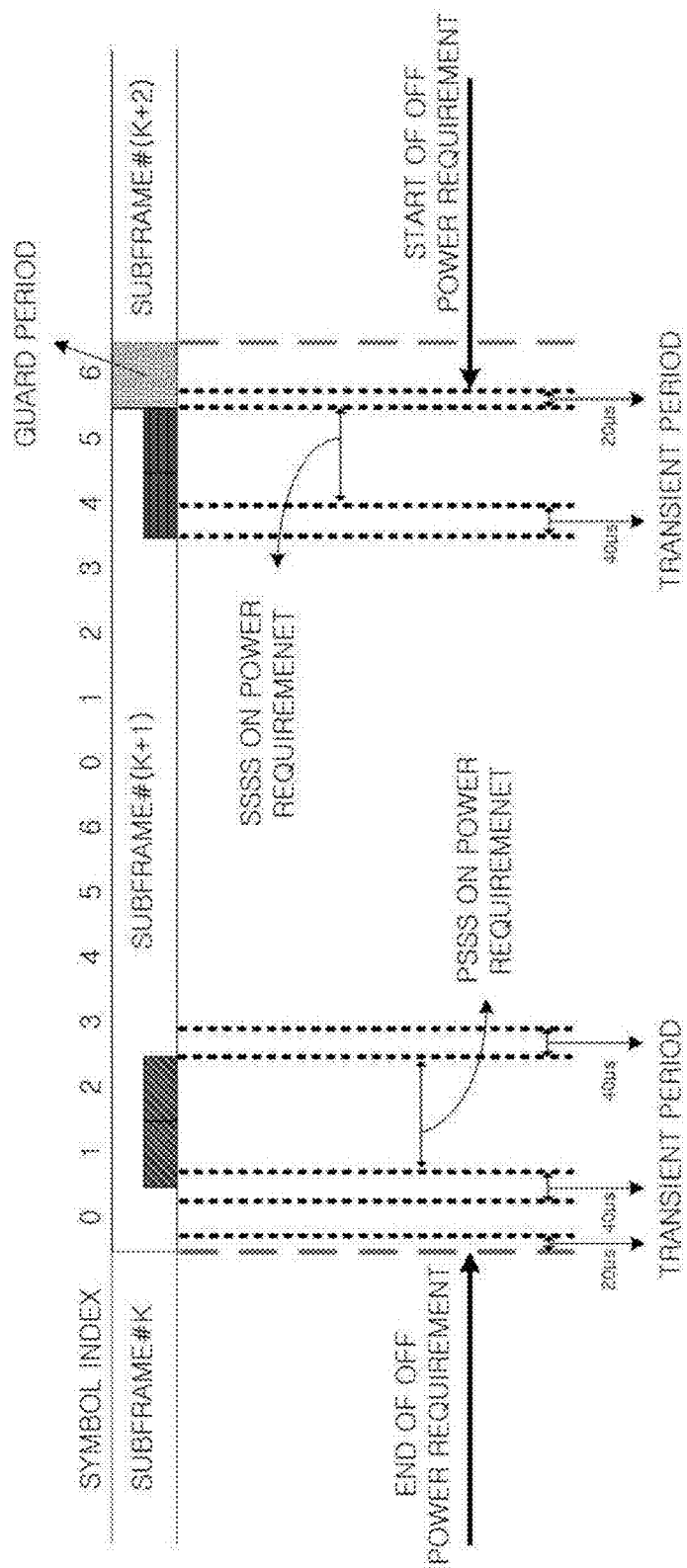
Figure 42:
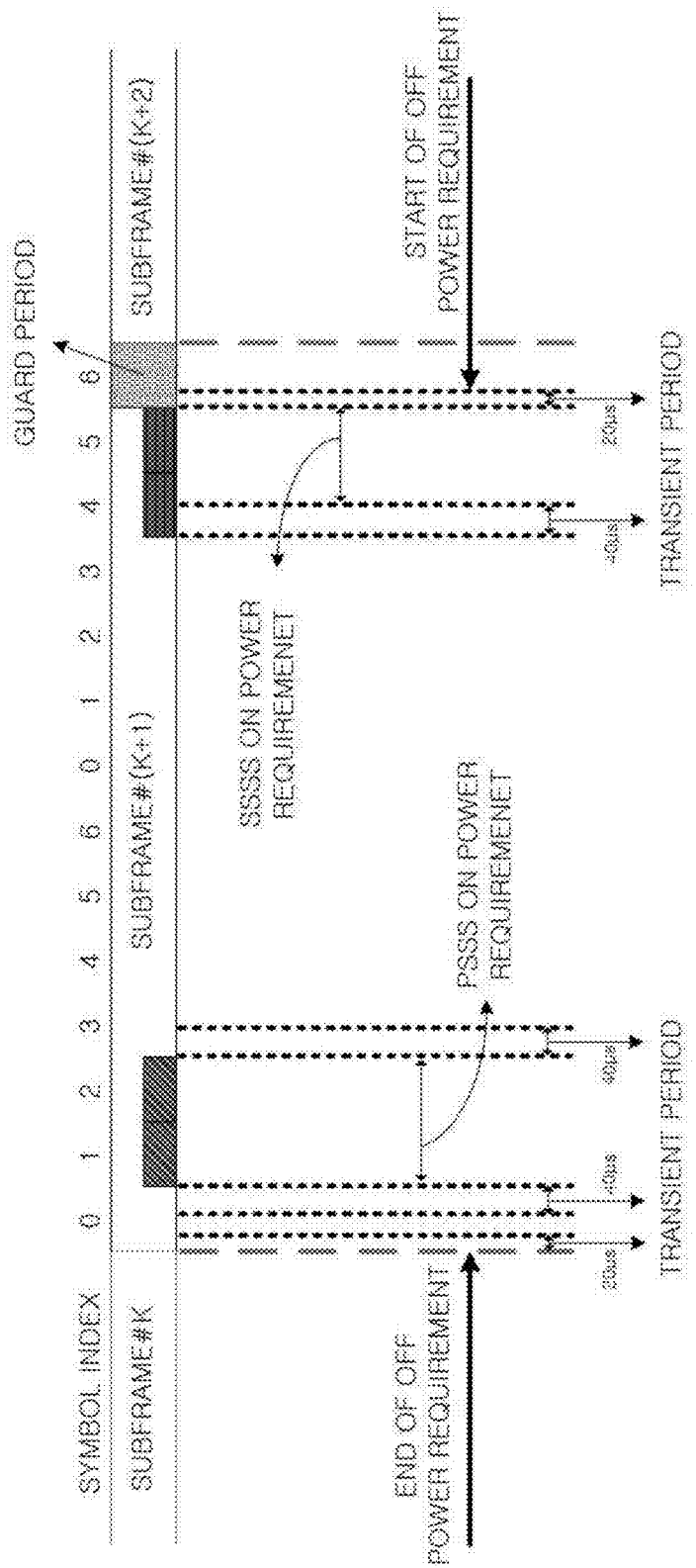
Figure 43:
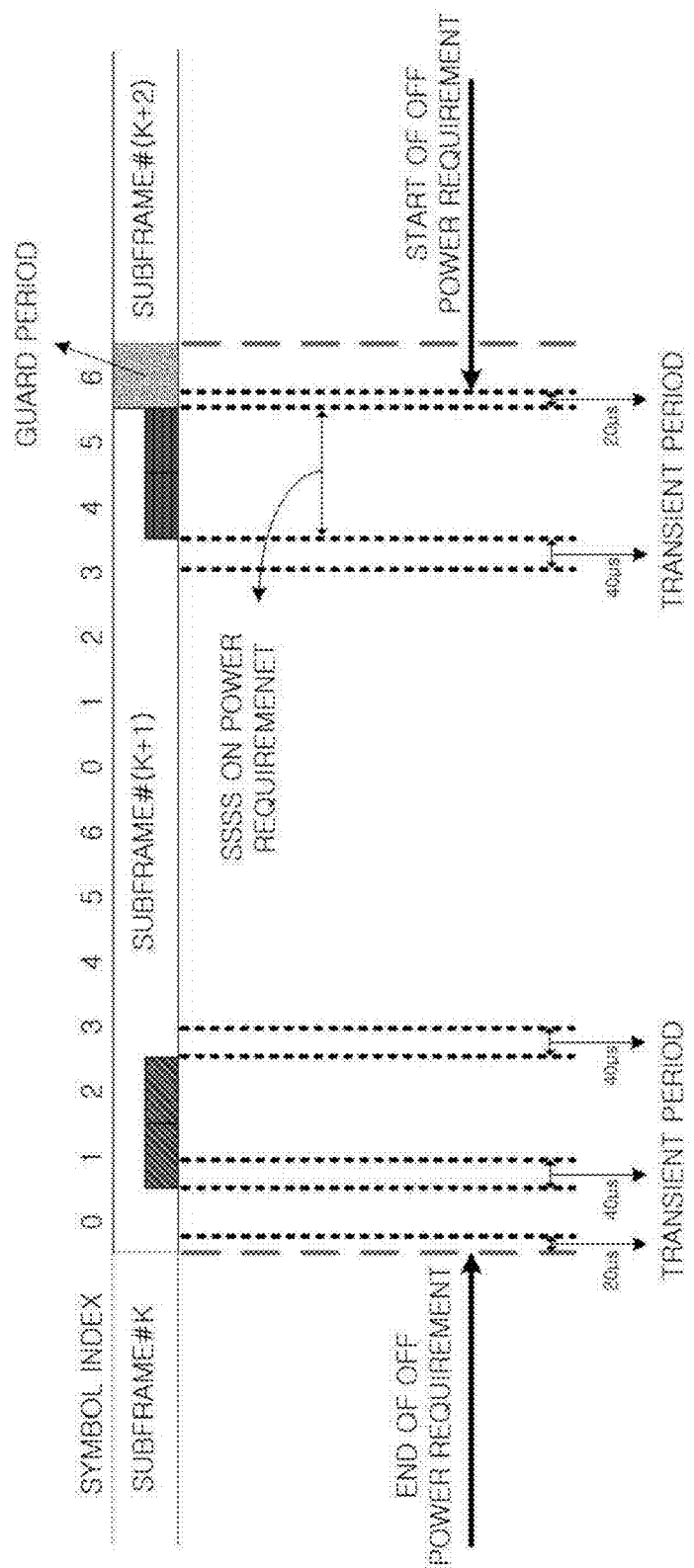
Figure 44:
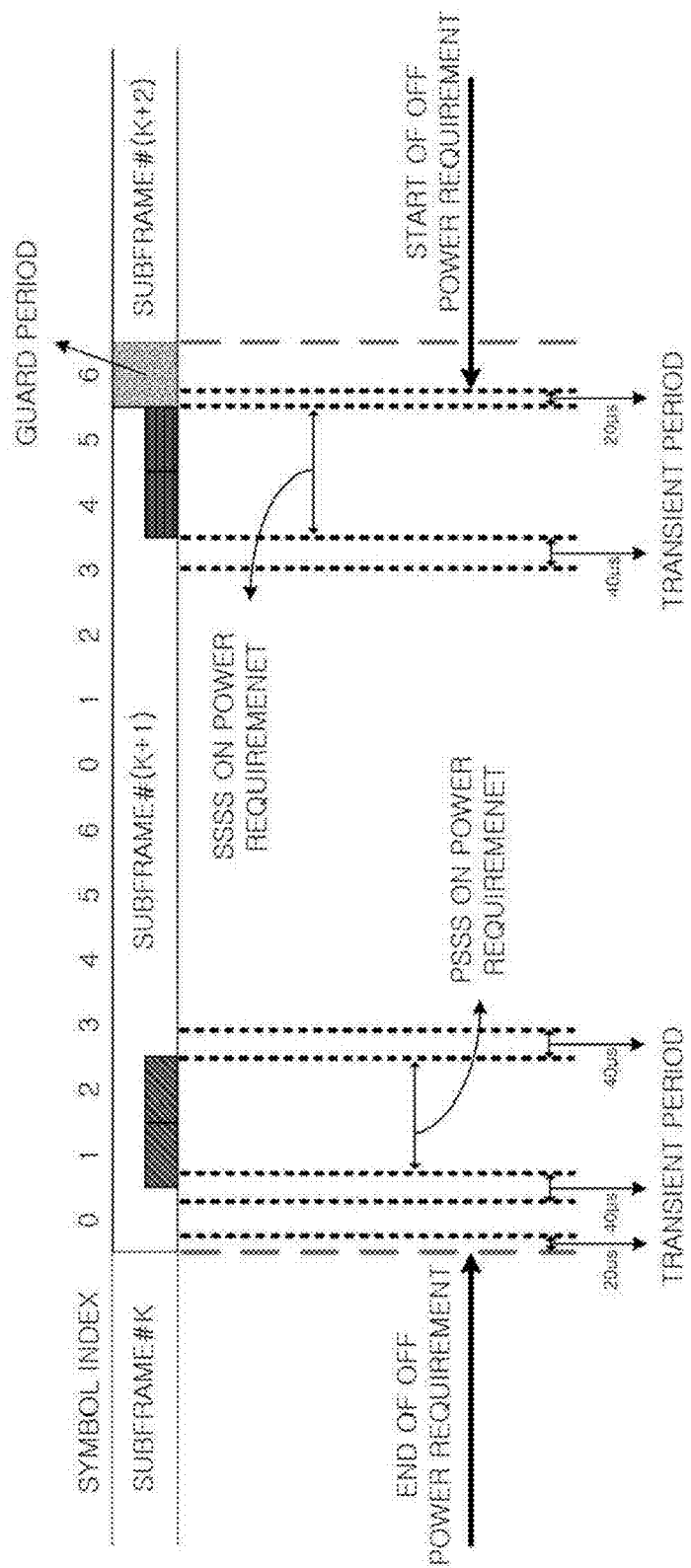

As a specific example, FIG. 25/FIG. 29 may be interpreted as a case where (Rule #1-1)/(Rule #1-2) described above are applied. In FIGS. 23 to 30, the "(power) transient periods" of 20/40 microseconds are assumed, and this is merely an example, and other values of "(power) transient period" may be set (/defined).

FIGS. 31 to 54 are views illustrating setting of 'PSSS/ SSSS/PSBCH related "(power) transient period" (and/or "(power) ON/OFF time mask") multiplexed and transmitted together on one subframe.

It is assumed that, when 'normal CP' is set, the reference signal DM-RS is not present (/transmitted) on the 'third symbol' of the 'first/second slots', and it is assumed that, when the extended CP is set, the reference signal DM-RS is not present (/transmitted) on the 'second symbol' of the 'first/second slots'. Under these assumptions, the methods (/rules) described above with reference to FIGS. 19 to 22 and/or FIGS. 23 to 30 may be applied.

Figure 45:
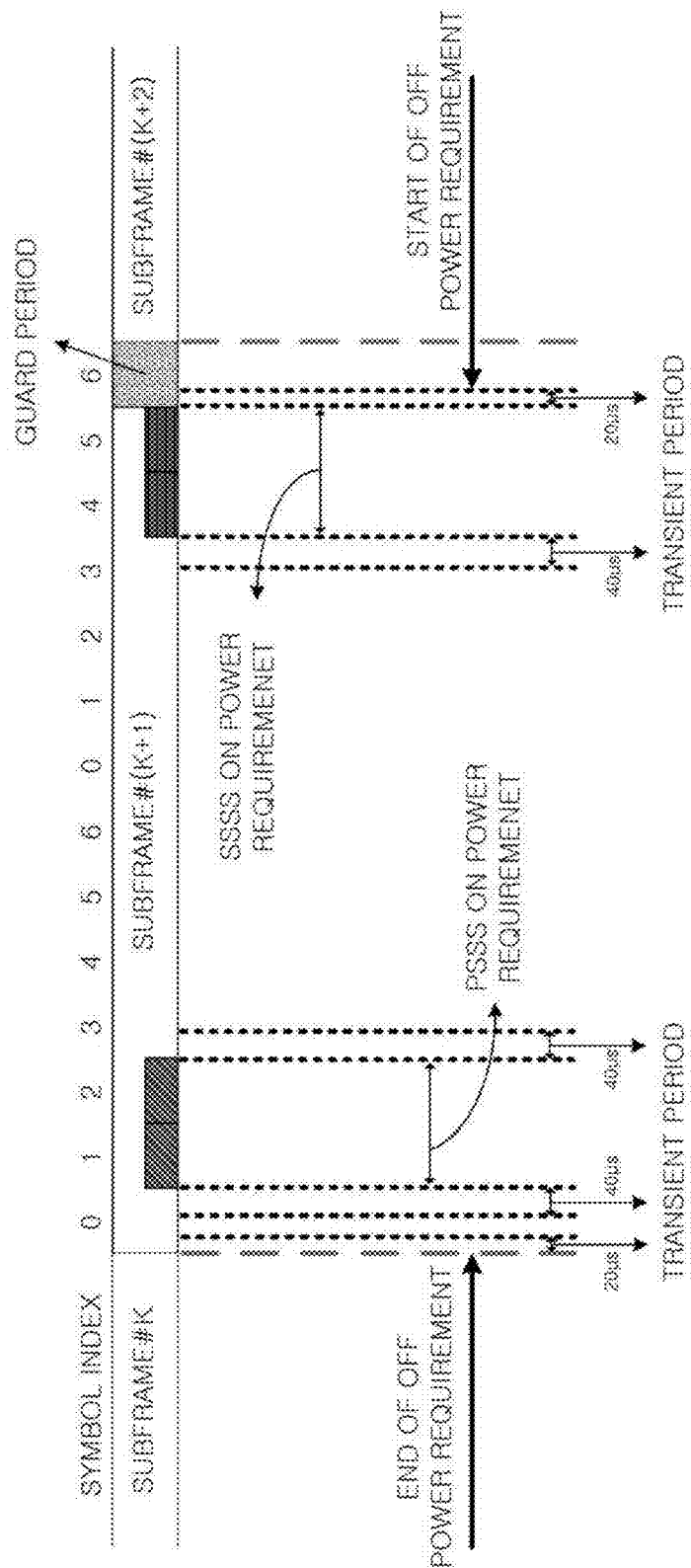
Figure 46:
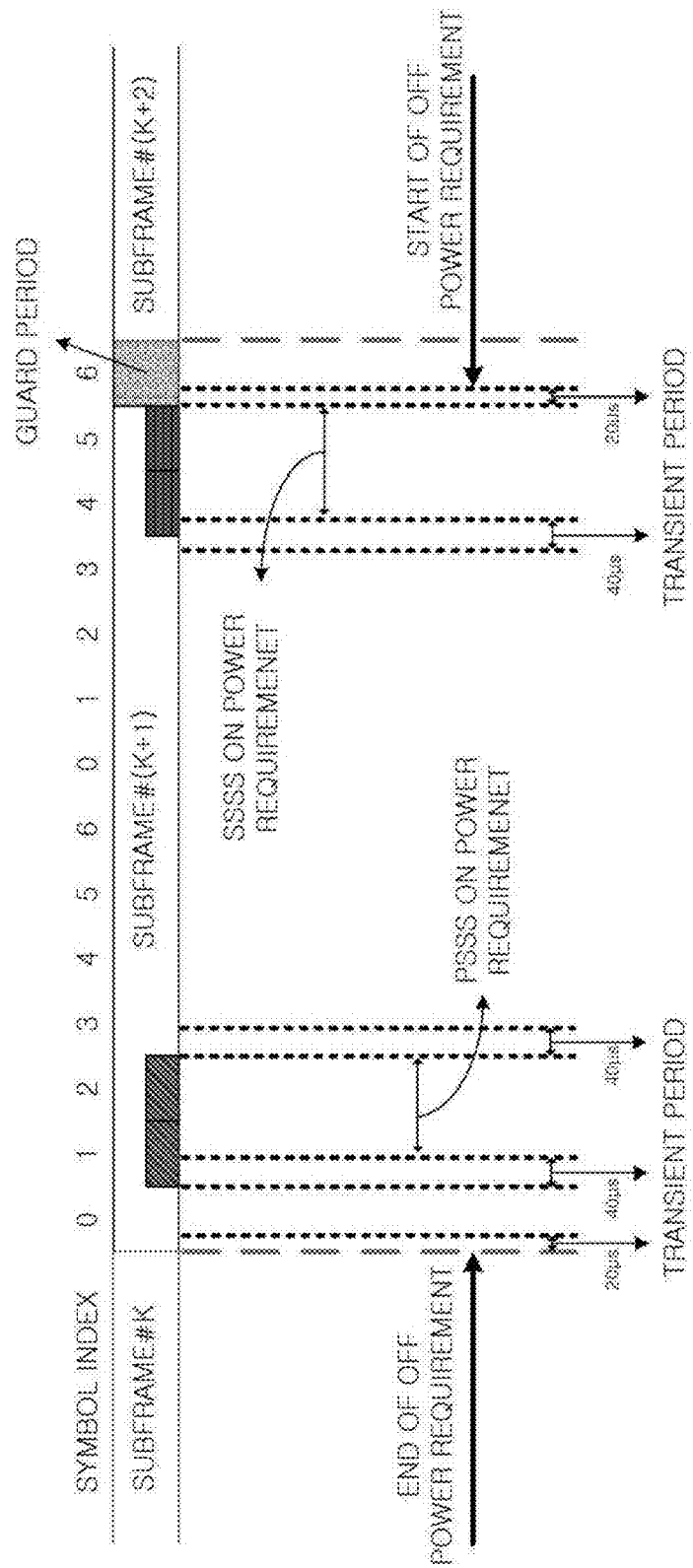
Figure 47:
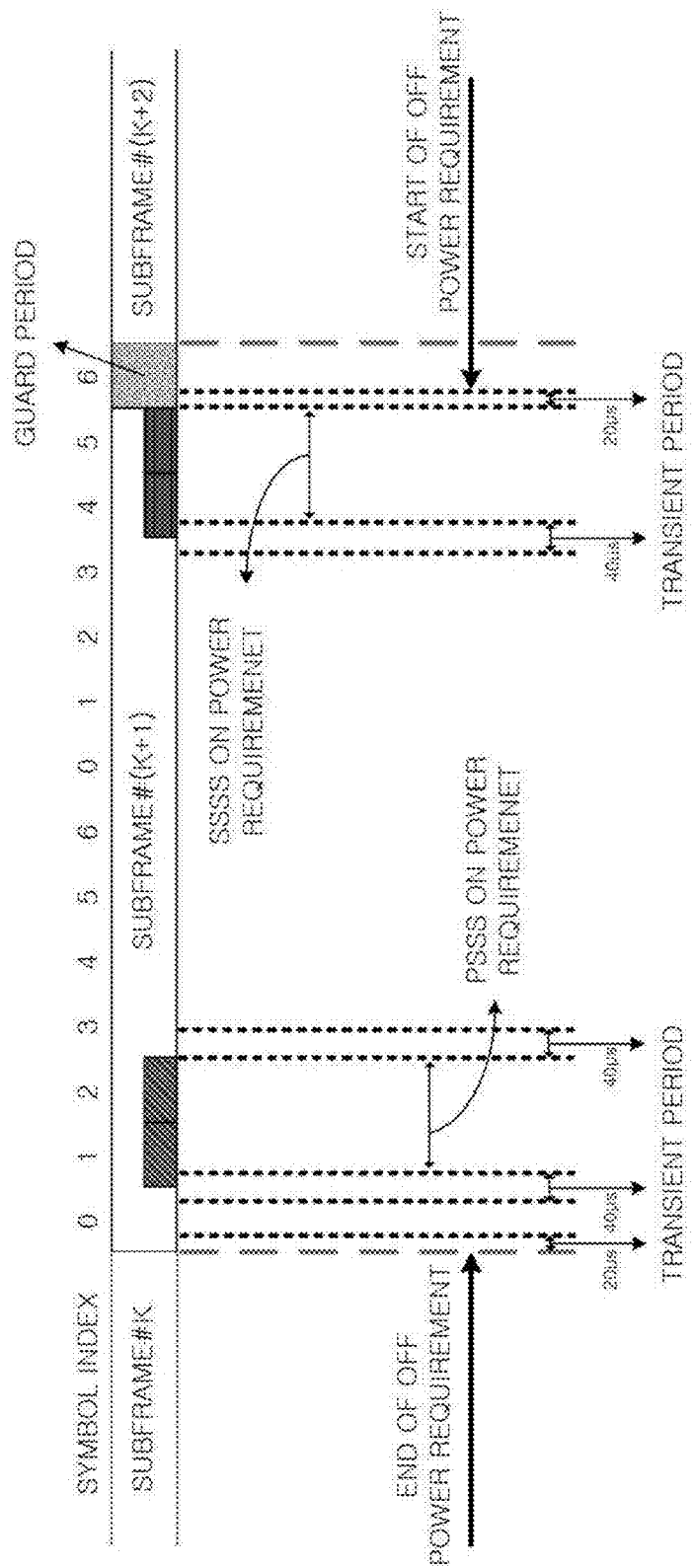
Figure 48:
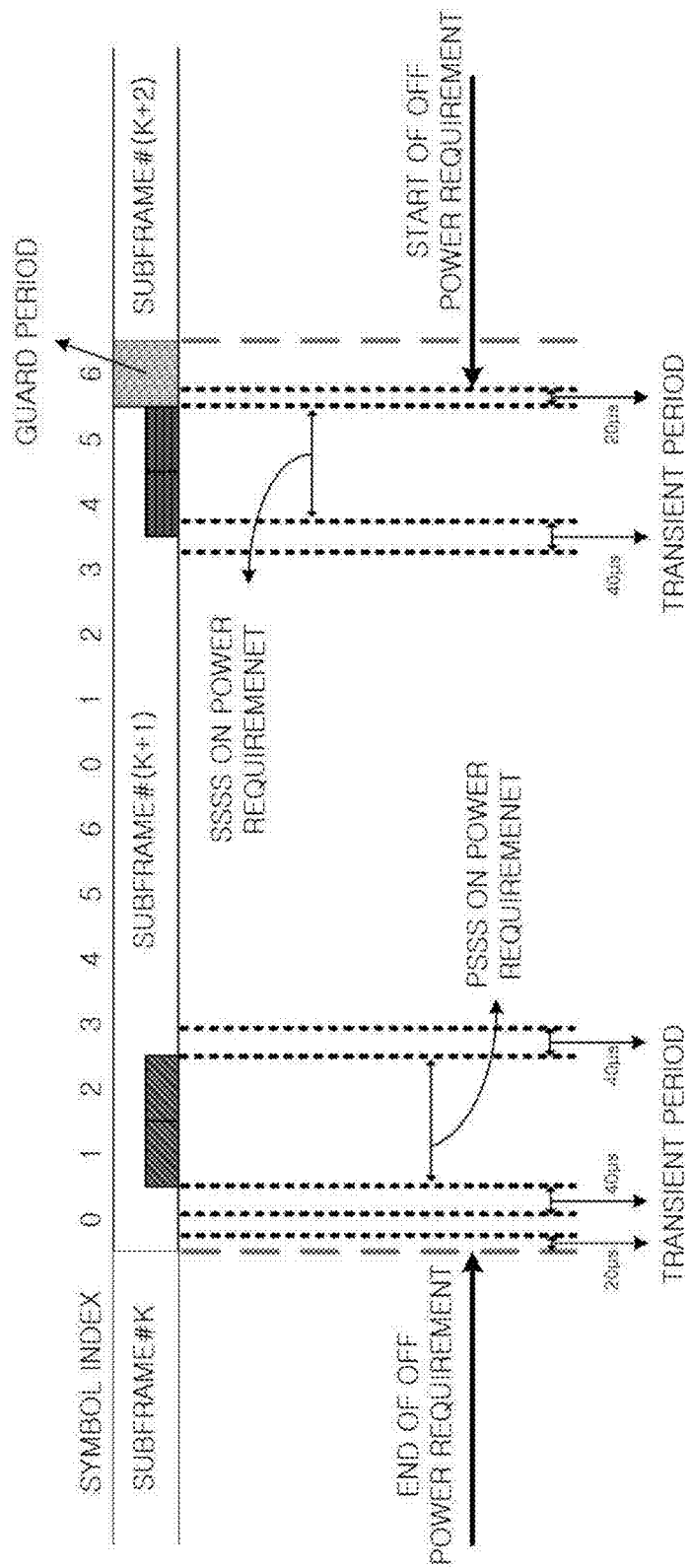
Figure 49:
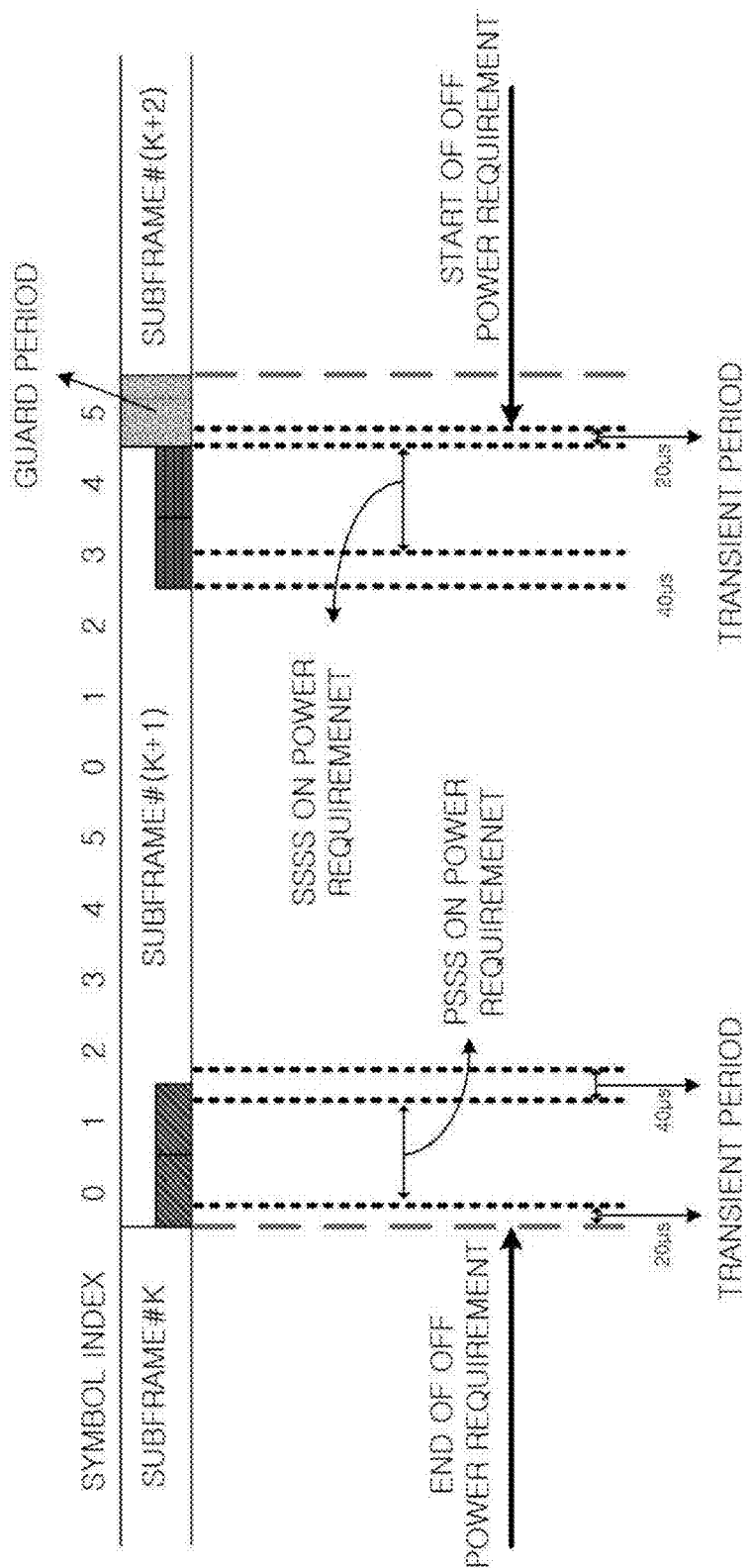
Figure 50:
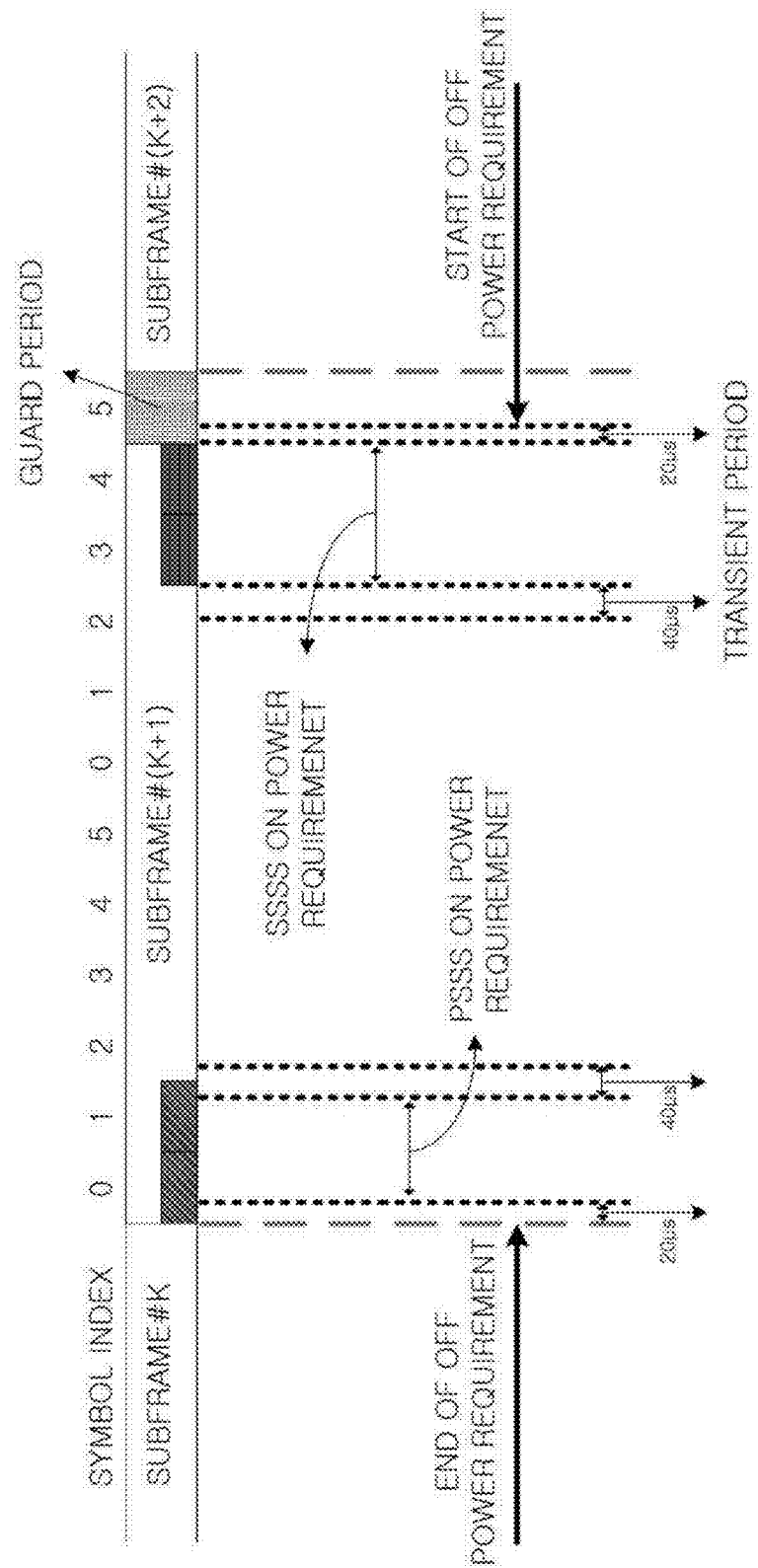
Figure 51:
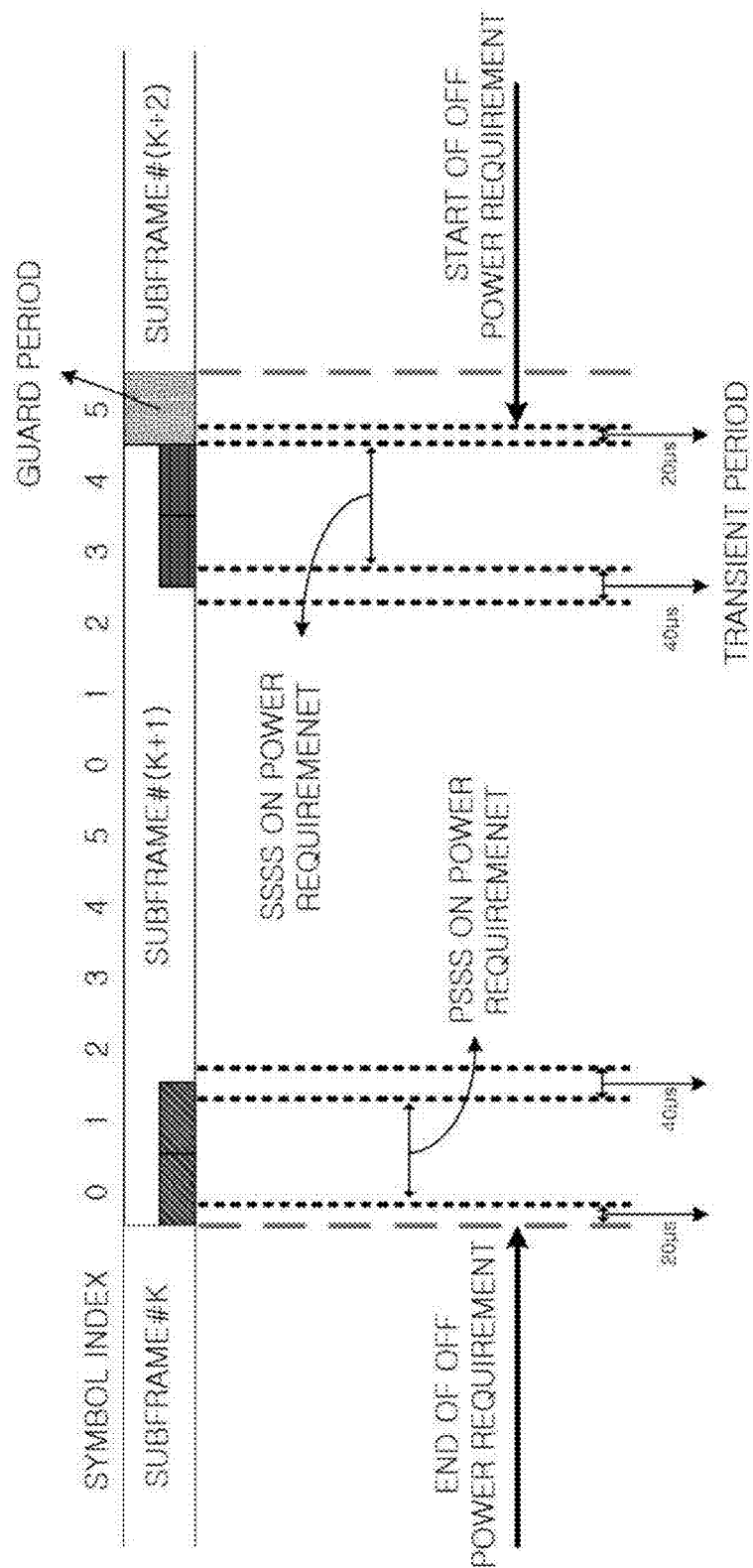
Figure 52:
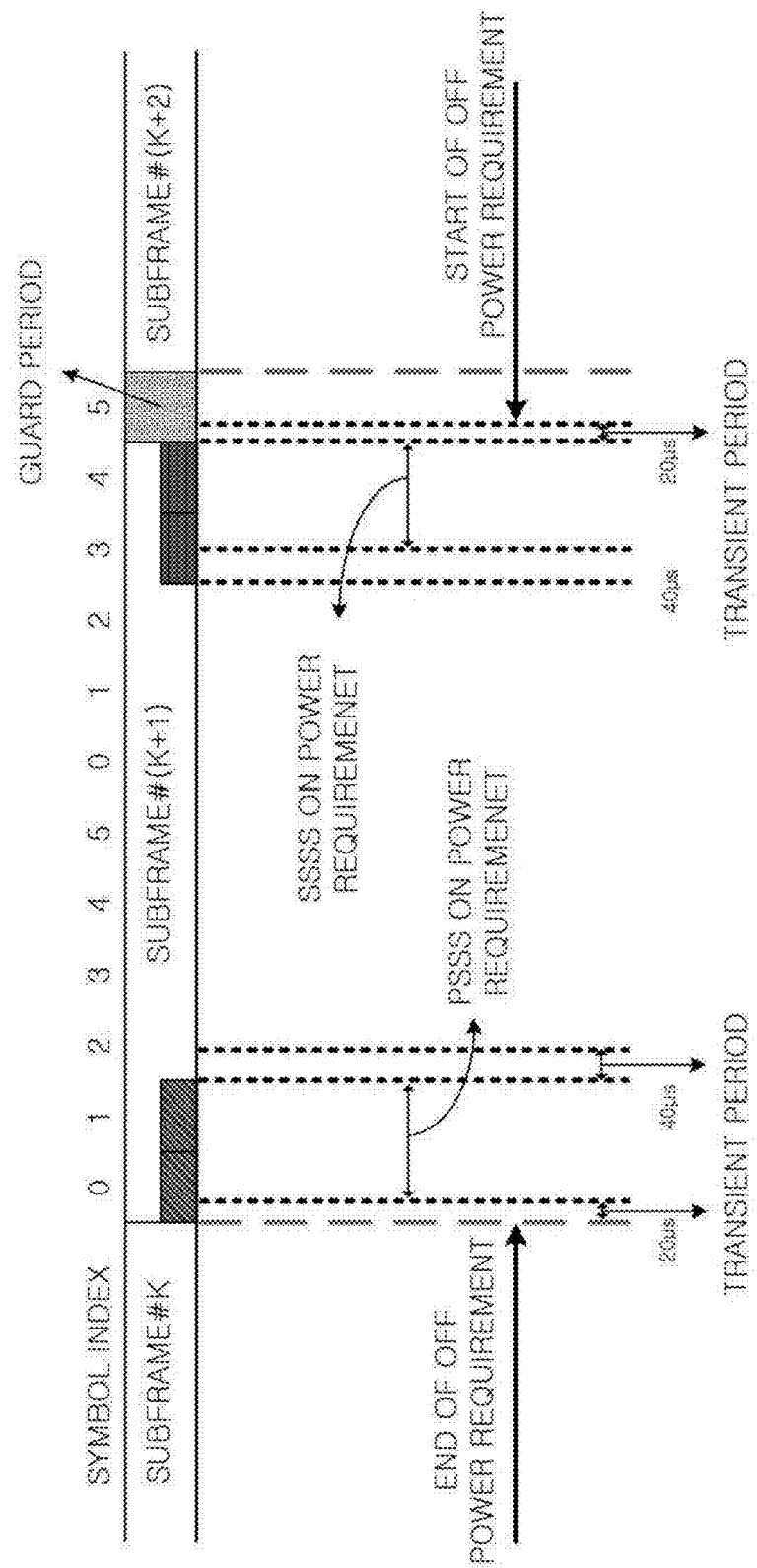
Figure 53:
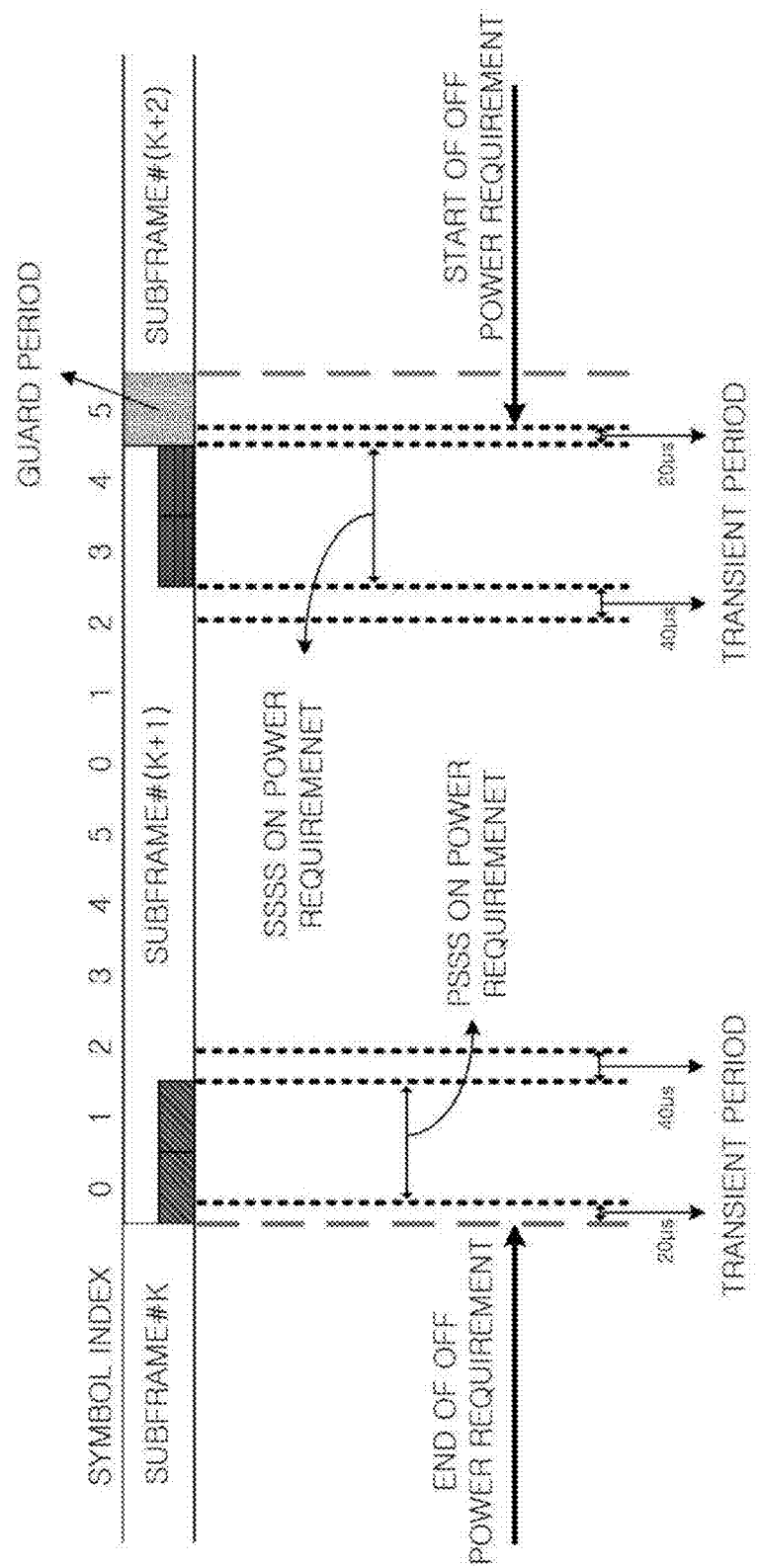
Figure 54:
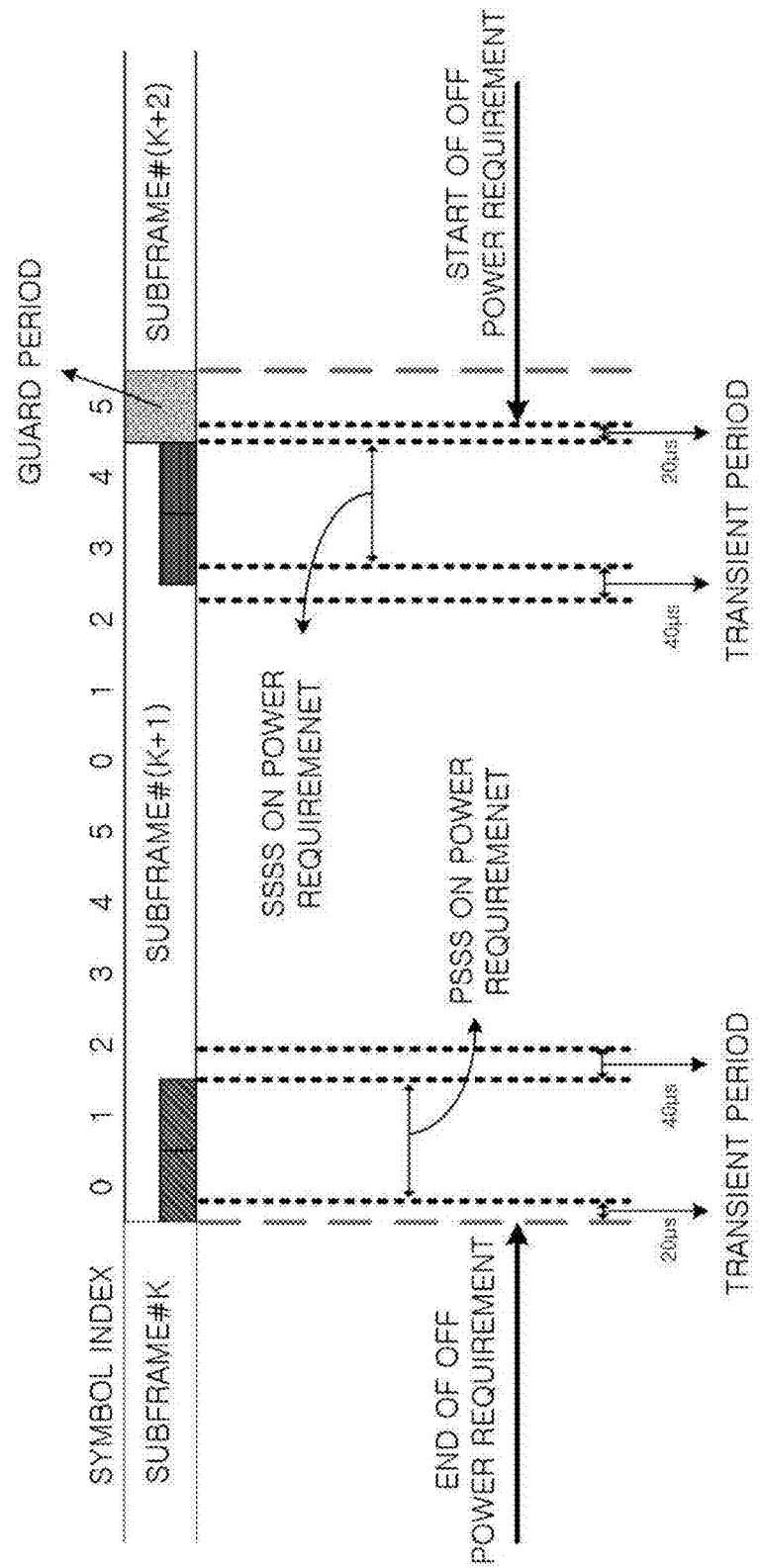

In a specific example, FIG. 45/FIG. 53 may be interpreted as a case where (Rule #1-1)/(Rule #1-2) described above is applied. In FIGS. 31 to 54, the "(power) transient periods" of 20/40 microseconds are assumed but this is merely an example and other value of "(power) transient period" may be set (/defined).

[Proposed method #2] For example, when an additional MPR (or 'MAXIMUM POWER BACKOFF') is applied to 'PSBCH transmission power' to alleviate 'CM (and/or PAPR) increase problem', the 'number of sections' in which the "(power) transient period" is set is also increased.

As the 'number of sections' is increased, the amount of (time) resource (or number of symbols) that may be used 'for the purpose of transmitting 'some channels/signals (e.g., PSSS/SSSS/PSBCH) on one subframe is reduced. This may lead to a 'transmission/reception performance degradation problem' of the corresponding channels/signals.

Hereinafter, a method for solving such a problem will be described. If (some of) the following rules are applied, the problem of the 'increase in the number of sections in which "(power) transient period" is set. For example, [Proposal method #2] may be selectively applied to a 'PSBCH' (transmission) situation in which 'SC-FDM(SINGLE CARRIER FREQUENCY DIVISION MULTIPLEXING) structure' is broken.

(Rule #2-1) The 'PSSS transmission power (and/or SSSS transmission power) may be set to be equal to the 'PSBCH transmission power' to which the additional 'MPR' (or 'MAXIMUM POWER BACKOFF') is applied.

For example, the application of the above rule may be interpreted as setting 'MPR' (or 'MAXIMUM POWER BACKOFF') in addition to 'PSSS transmission power'.

Figure 55:
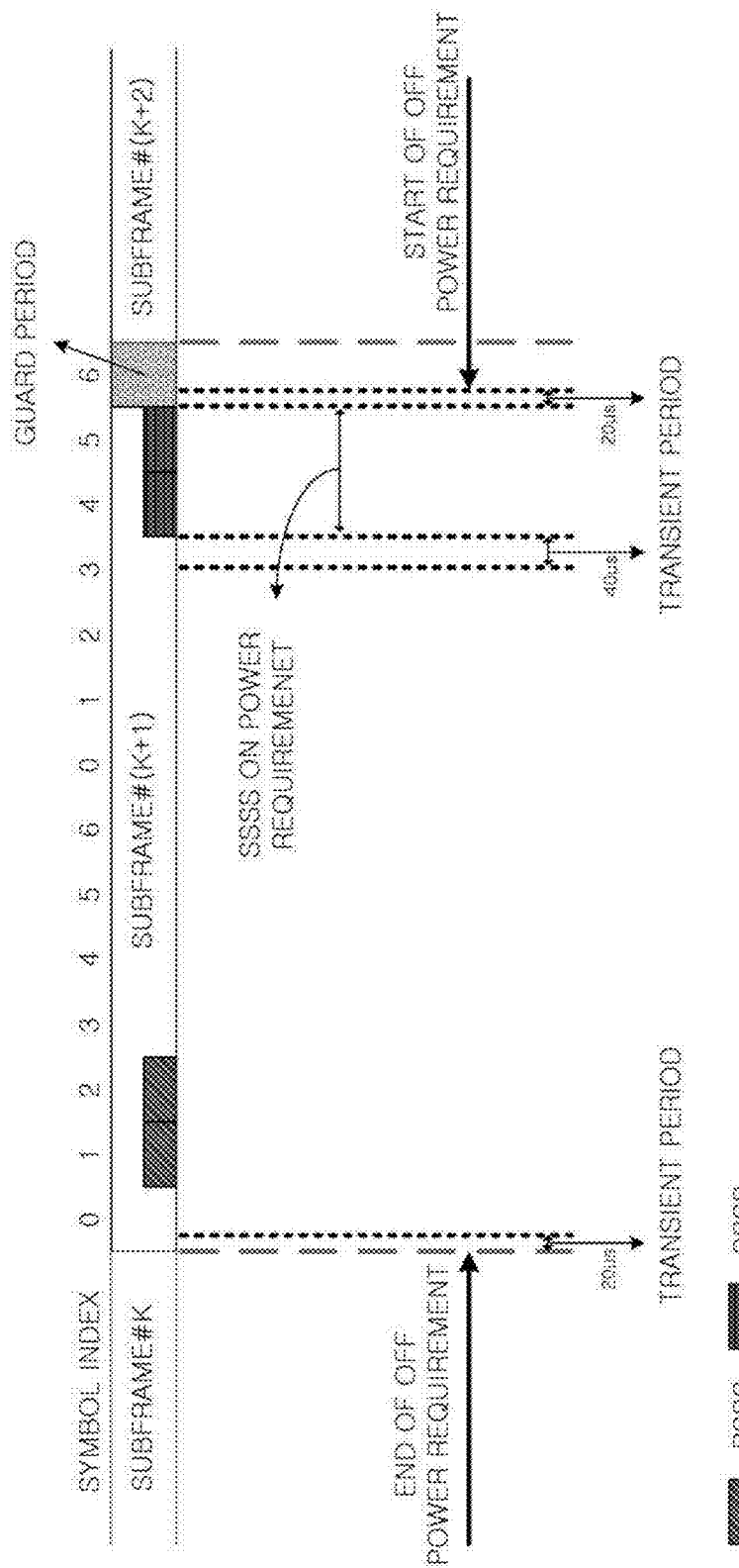
FIGS. 55 and 56 illustrate an example in which the above-described (Rule #2-1) is applied under the same situation as that of FIGS. 25 and 29, respectively.
Figure 56:
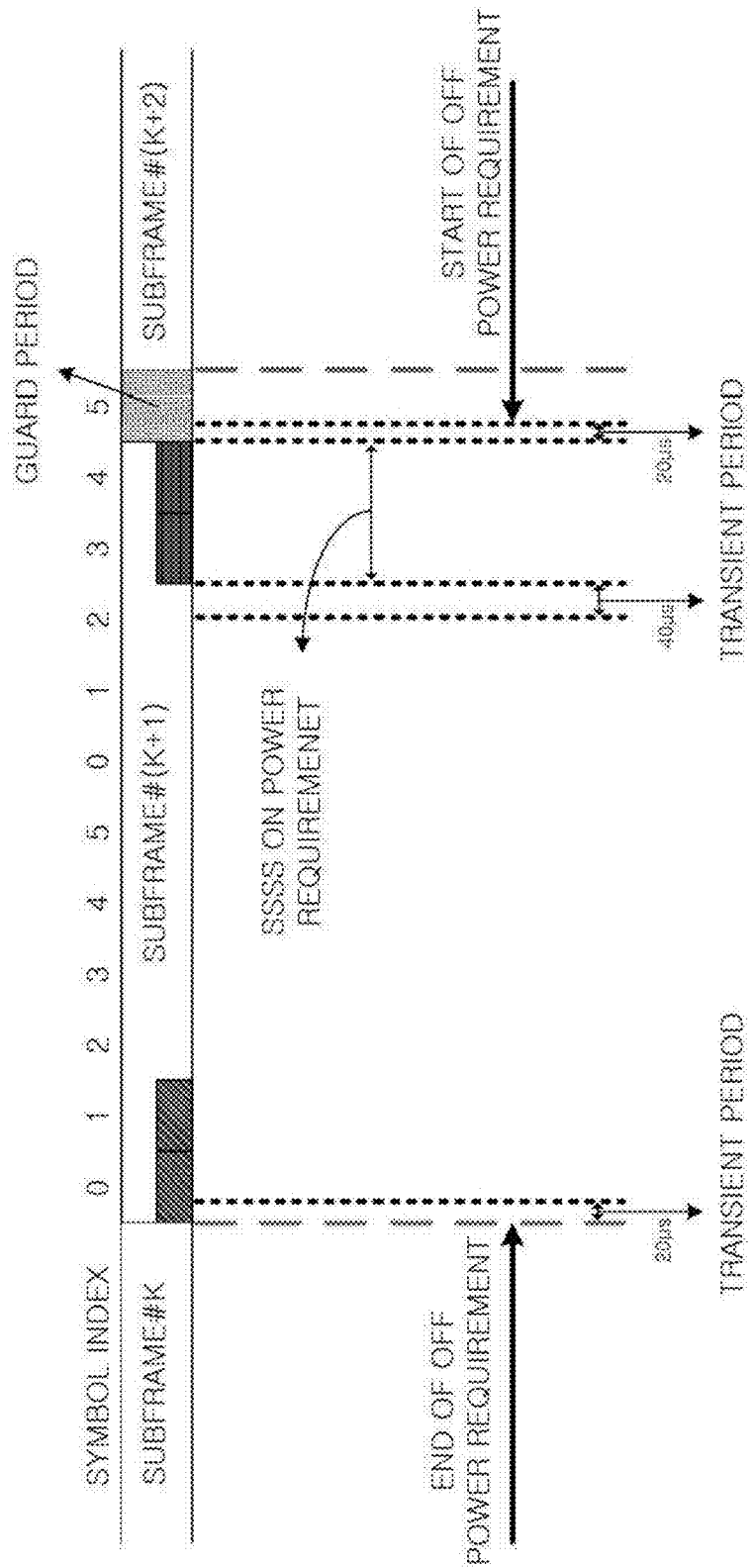

FIGS. 55 and 56 illustrate an example in which the above-described (Rule #2-1) is applied under the same situation as that of FIGS. 25 and 29, respectively.

In FIGS. 55 and 56, "(power) transient periods" of 20/40 microseconds are assumed, but it is only one example and other values of "(power) transient periods" may be set (/defined).

Figure 59:
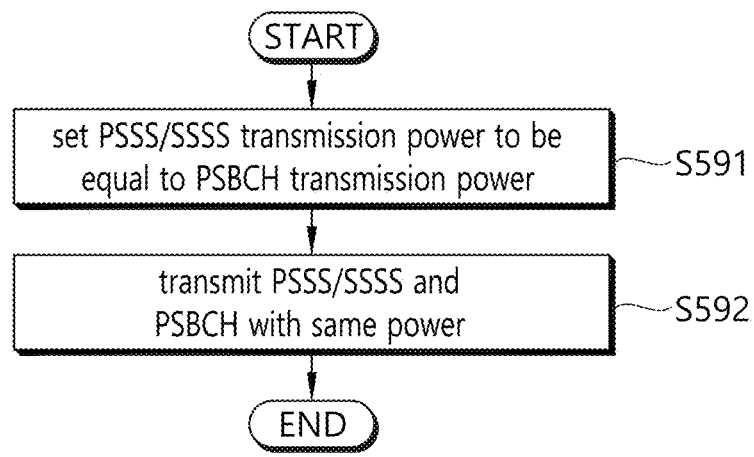
FIG. 59 illustrates a V2X signal transmission method according to another embodiment of the present invention.

FIG. 59 illustrates a V2X signal transmission method according to another embodiment of the present invention.

Referring to FIG. 59, the UE sets the PSSS/SSSS transmission power to be equal to the PSBCH transmission power (S591).

The MS transmits the PSSS/SSSS and the PSBCH set to the same power (S592).

(Rule #2-2) The "(power) transient period" may not be set between (A) a symbols used for the purpose of 'SSSS' transmission and (B) a symbol used for the purpose of transmitting 'PSBCH' when a difference between the 'SSSS transmission power' with 'MPR' and 'PSBCH TX POWER' with additional 'MPR' (or 'MAXIMUM POWER BACKOFF') is smaller than a predefined or signaled threshold value.

Here, for example, the SSSS of 'M-SEQUENCE' has CM (and/or PAPR) characteristic higher than that of the PSSS of the 'ZADOFF-CHU (ZF) sequence', and 'MPR' (e.g., '≤4 db') related to 'SSSS transmission power' serves to alleviate this.

Here, for example, application of the rule may be interpreted such that 'SSSS transmission power' and 'PSBCH transmission power' are set to be equal to each other.

Figure 57:
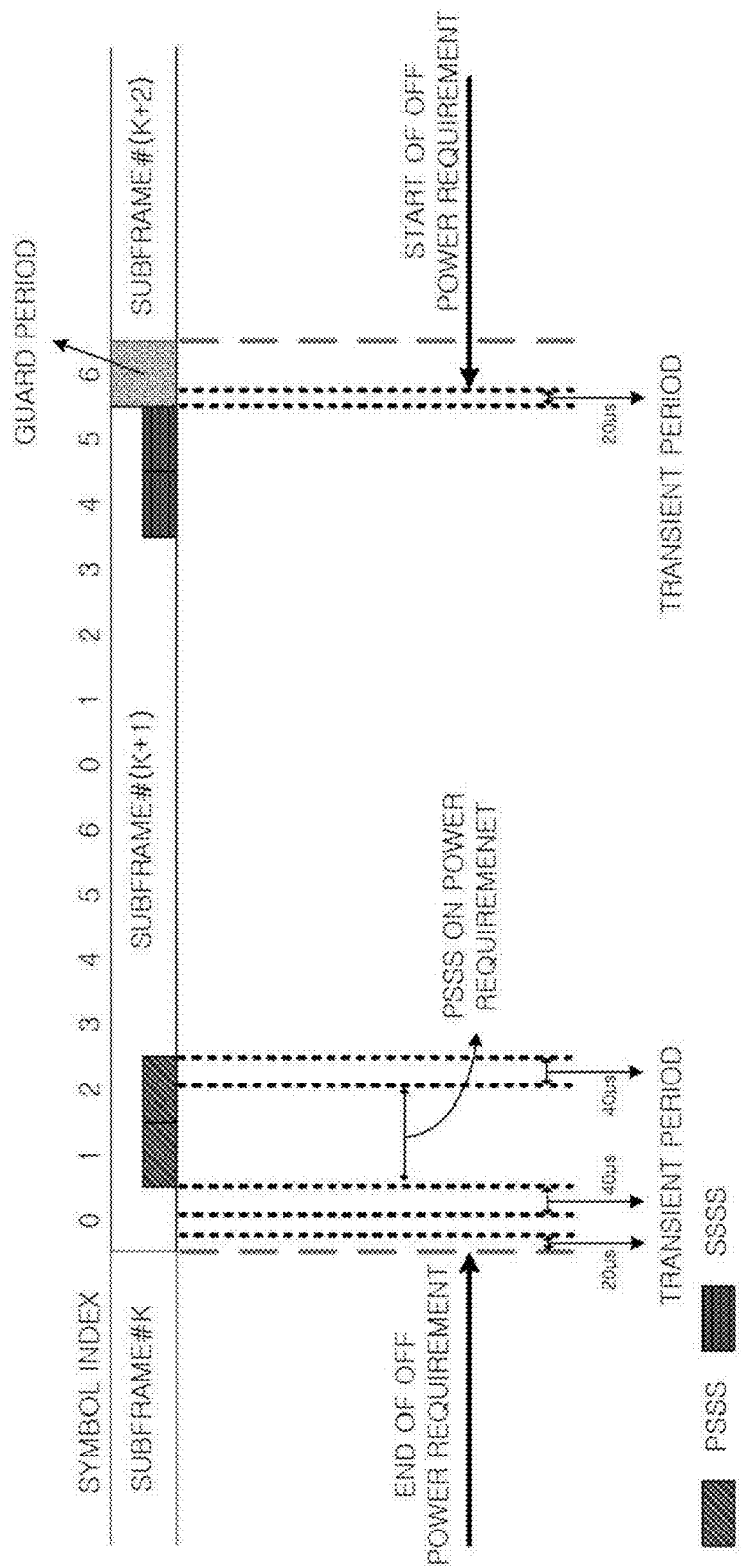
FIGS. 57 to 58 illustrate an example in which (Rule #2-2) is applied in the same situation as that of FIGS. 25 and 29, respectively.
Figure 58:
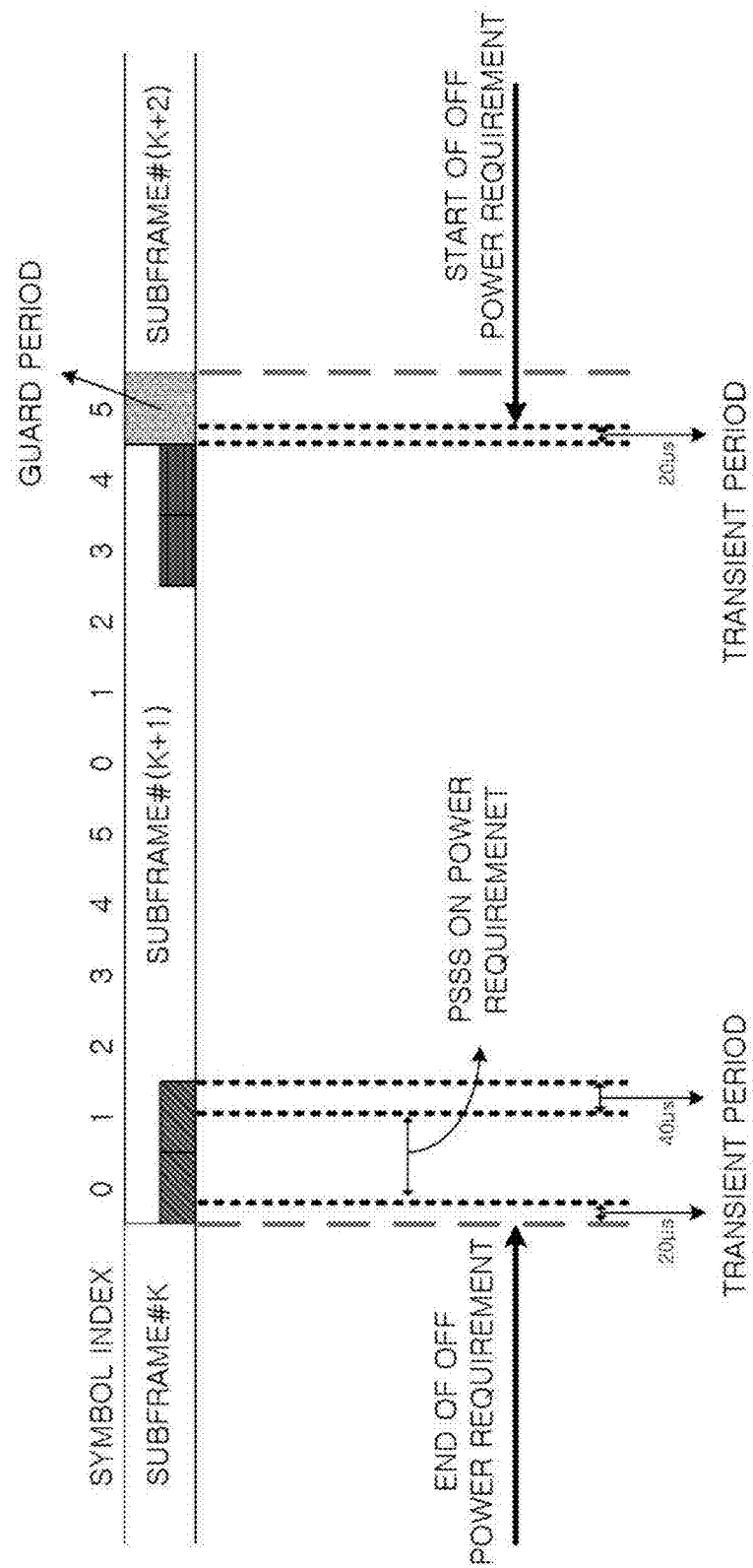

FIGS. 57 to 58 illustrate an example in which (Rule #2-2) is applied in the same situation as that of FIGS. 25 and 29, respectively.

Here, for example, it is assumed that a difference between the 'SSSS transmission power' (with 'MPR') and the 'PSBCH transmission power' with 'MPR' (or 'MAXIMUM POWER BACKOFF') is greater than a predefined or signaled threshold.

In FIGS. 57 and 58, "(power) transient periods" of 20/40 microseconds are assumed but it is only one example and other values of "(power) transient periods" may be set or defined.

In another example, by combining (Rule #2-1) and (Rule #2-2) described above (or by setting 'transmission power' related to 'PSSS/SSSS/PSBCH' to be equal), a '(power) transient period' among 'PSSS, PSBCH, and SSSS' may not be necessary.

When such a rule is applied, the V2X UE may determined the 'MAR' of a signal/channel (e.g., a signal/channel requesting a largest 'MAR') causing a 'bottleneck' among 'PSSS, PSBCH, and SSSS' and apply the corresponding 'MPR' to all the symbols on the corresponding subframe.

The aforementioned embodiments of the present invention may be included as one of methods of implementing the present invention and thus regarded as proposed methods. In addition, the aforementioned proposed methods may be independently implemented or some proposed methods may be combined or merged. Although the present invention has been described based on the 3GPP LTE/LTE-A system for the purposes of description, the scope of the system to which the proposed method is applied may extend to other systems in addition to the 3GPP LTE/LTE-A system. The proposed methods of the present invention may also extend for D2D communication. D2D communication refers to that a UE communicates directly with another UE using a wireless channel. Herein, for example, D2D communication means that a UE communicates directly with another UE using a wireless channel. Here, for example, a UE refers to a user UE, but in case where network equipment such as a base station transmits/receives a signal according to a communication method between UEs, the network equipment may also be regarded as a UE.

For example, a rule may be defined such that the proposed methods described above are limitedly applied only to MODE 2 (V2X (/D2D)) communication and/or TYPE 1 (V2X (/D2D) discovery (and/or MODE 1 (V2X(/D2D)) communication and/or TYPE 2 (V2X(/D2D)). Also, for example, a rule may be defined such that the proposed methods described above are limitedly applied only to IN-COVERAGE D2D(/V2X) UE (and/or OUT-COVERAGE D2D(/V2X) UE) (and/or RRC CONNECTED D2D(/V2X) UE (and/or RRC IDLE D2D(/V2X) UE) and/or RELAY D2D(/V2X) UE (and/or REMOTE (D2D(/V2X)) UE) (participating in RELAY communication). In another example, a rule may be defined such that the proposed methods described above are limitedly applied only to 'periodical V2X message transmission operation' (or 'event-triggered V2X message transmission operation').

Figure 60:
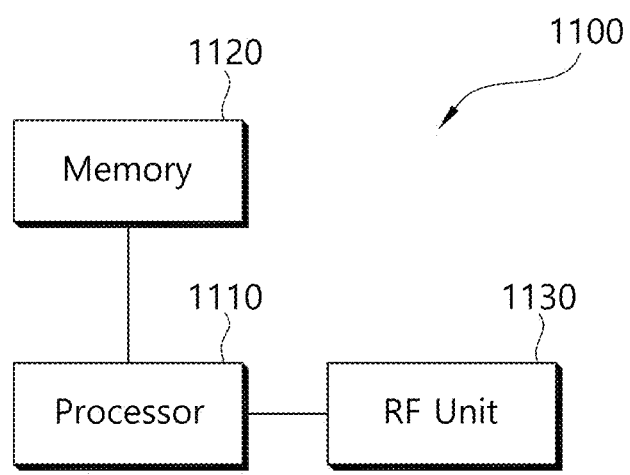
FIG. 60 is a block diagram illustrating a UE in which an embodiment of the present invention is implemented.

FIG. 60 is a block diagram illustrating a UE in which an embodiment of the present invention is implemented.

Referring to FIG. 60, a UE 1100 includes a processor 1110, a memory 1120, and a radio frequency (RF) unit 1130. The processor 1110 implements the proposed functions, processes and/or methods.

The RF unit 1130 is connected to the processor 1110 to transmit and receive a radio signal.

The processor may include an application-specific integrated circuit (ASIC), other chipset, a logic circuit, and/or a data processing device. The memory may include a read-only memory (ROM), a random access memory (RAM), a flash memory, a memory card, a storage medium, and/or other storage devices. The RF unit may include a baseband circuit for processing a radio signal. When the embodiment is implemented in software, the above-described techniques may be implemented with a module (process, function, etc.) that performs the functions described above. The module may be stored in the memory and may be executed by the processor. The memory may be present inside or outside the processor and may be coupled to the processor by a well known means.

What is claimed is:

1. A vehicle-to-everything (V2X) signal transmission method in a wireless communication system, the V2X signal transmission method performed by a user equipment (UE) and comprising:

determining a symbol among candidate symbols for transmitting the V2X signal including at least one of a demodulation reference signal (DMRS), a sidelink reference signal, a primary sidelink synchronization signal (PSSS), a secondary synchronization signal (SSSS) or a signal transmitted from a physical sidelink broadcast channel (PSBCH); and transmitting the V2X signal on the determined symbol, wherein the candidate symbols are symbols excluding overlapping symbols which overlap a power transient period, wherein the power transient period is a period between a transmission power-on state and a transmission power-off state, and wherein, when a difference between a SSSS transmission power to which a first maximum power reduction (MPR) is applied and a PSBCH transmission power to which a second MPR is applied is smaller than a threshold value, time resources between first symbols for SSSS transmission and second symbols for PSBCH transmission are included in the candidate symbols.

2. The V2X signal transmission method of claim 1, wherein the power transient period is a time period in which transmission power-on state changes to a transmission power-off state or the transmission power-off state changes to transmission power-on state.

3. The V2X signal transmission method of claim 1, wherein the determined symbol is determined from among symbols excluding symbols overlapping the power transient period in a subframe including 14 symbols.

4. The V2X signal transmission method of claim 1, wherein when the specific signal includes a sidelink reference signal and a signal transmitted from the PSBCH, transmission power for the sidelink reference signal and transmission power for the signal transmitted from the PSBCH are set to be equal.

5. The V2X signal transmission method of claim 1, wherein, when consecutive long subslot and short subslot are present, the power transcient period is positioned on a boundary between the long subslot and the short subslot and positioned in the long subslot, and wherein the long subslot includes more than 2 symbols and the short subslot includes one symbol or two symbols.

6. The V2X signal transmission method of claim 5, wherein the transmission power-on state is within the long subslot and the transmission power-off state is positioned on the boundary between the long subslot and the short subslot.

7. The V2X signal transmission method of claim 1, wherein the threshold value is predefined.

8. The V2X signal transmission method of claim 1, wherein the threshold value is transmitted from a network.

9. The V2X signal transmission method of claim 1, wherein the first MPR and the second MPR are different from each other.

10. The V2X signal transmission method of claim 1, wherein the first MPR is smaller than the second MPR.

11. A user equipment (UE) comprising:

a radio frequency (RF) unit transmitting and receiving a radio signal; and a processor coupled to the RF unit to operate, wherein the processor:

determines a symbol among candidate symbols for transmitting a V2X signal including at least one of a demodulation reference signal (DMRS), a sidelink reference signal, a primary sidelink synchronization signal (PSSS), a secondary synchronization signal (SSSS) or a signal transmitted from a physical sidelink broadcast channel (PSBCH), and transmits the V2X signal on the determined symbol, wherein the candidate symbols are symbols excluding overlapping symbols which overlap a power transient period, wherein the power transient period is a period between a transmission power-on state and a transmission power-off state, and wherein, when a difference between a SSSS transmission power to which a first maximum power reduction (MPR) is applied and a PSBCH transmission power to which a second MPR is applied is smaller than a threshold value, time resources between first symbols for SSSS transmission and second symbols for PSBCH transmission are included in the candidate symbols.

12. The user equipment of claim 11, wherein the power transient period is a time period in which transmission power-on state changes to a transmission power-off state or the transmission power-off state changes to transmission power-on state.

13. The user equipment of claim 11, wherein the determined symbol is determined from among symbols excluding symbols overlapping the power transient period in a subframe including 14 symbols.

14. The user equipment of claim 11, wherein when the specific signal includes a sidelink reference signal and a signal transmitted from the PSBCH, transmission power for the sidelink reference signal and transmission power for the signal transmitted from the PSBCH are set to be equal.

* * * * *